US012801433B2

(12) United States Patent
Zhang et al.

(10) Patent No.: US 12,801,433 B2
(45) Date of Patent: Nov. 17, 2026

(54) INTER-CHIP COMMUNICATION CIRCUIT, METHOD AND SYSTEM

(71) Applicant: Shanghai Cambricon Information Technology Co., Ltd., Shanghai (CN)

(72) Inventors: Yingnan Zhang, Shanghai (CN); Qinglong Chai, Shanghai (CN); Lu Chao, Shanghai (CN); Yao Zhang, Shanghai (CN); Shaoli Liu, Shanghai (CN); Jun Liang, Shanghai (CN)

(73) Assignee: SHANGHAI CAMBRICON INFORMATION TECHNOLOGY CO., LTD., Shanghai (CN)

( * ) Notice: Subject to any disclaimer, the term of this patent is extended or adjusted under 35 U.S.C. 154(b) by 465 days.

(21) Appl. No.: 18/259,684

(22) PCT Filed: Dec. 30, 2021

(86) PCT No.: PCT/CN2021/143162
§ 371 (c)(1),
(2) Date: Jun. 28, 2023

(87) PCT Pub. No.: WO2022/143917
PCT Pub. Date: Jul. 7, 2022

(65) Prior Publication Data

US 2024/0054012 A1 Feb. 15, 2024

(30) Foreign Application Priority Data

Dec. 31, 2020 (CN) ......................... 202011624931.0
Dec. 31, 2020 (CN) ......................... 202011624932.5
Dec. 31, 2020 (CN) ......................... 202011631683.2

(51) Int. Cl.
*G06F 9/48* (2006.01)
*G06F 9/46* (2006.01)
(Continued)

(52) U.S. Cl.
CPC .............. *G06F 9/4881* (2013.01); *G06F 9/46* (2013.01); *G06F 9/461* (2013.01); *G06F 9/48* (2013.01);
(Continued)

(58) Field of Classification Search
CPC ... G06F 9/46; G06F 9/462; G06F 9/48; G06F 9/4806; G06F 9/4843; G06F 9/485;
(Continued)

(56) References Cited

U.S. PATENT DOCUMENTS 7,080,365 B2 * 7/2006 Broughton .............. G06F 8/427 716/108
10,620,958 B1 * 4/2020 Cheng ................ H03K 19/0008
(Continued)

FOREIGN PATENT DOCUMENTS

CN 111381958 A 7/2020

OTHER PUBLICATIONS

CN202011631683.2—First Office Action mailed on Feb. 6, 2024, 14 pages.
(Continued)

*Primary Examiner* — Charles M Swift
(74) *Attorney, Agent, or Firm* — Getech Law LLC; Jun Ye

(57) ABSTRACT

The present disclosure provides a circuit, method and system for inter-chip communication. The method is implemented in a computation apparatus, where the computation apparatus is included in a combined processing apparatus, and the combined processing apparatus includes a general interconnection interface and other processing apparatus. The computation apparatus interacts with other processing apparatus to jointly complete a computation operation specified by a user. The combined processing apparatus also includes a storage apparatus. The storage apparatus is
(Continued)

respectively connected to the computation apparatus and other processing apparatus and is used for storing data of the computation apparatus and other processing apparatus.

18 Claims, 17 Drawing Sheets

(51) Int. Cl.
*G06F 9/50* (2006.01)
*G06F 15/163* (2006.01)

(52) U.S. Cl.
CPC .......... *G06F 9/4806* (2013.01); *G06F 9/4843* (2013.01); *G06F 9/485* (2013.01); *G06F 9/50* (2013.01); *G06F 9/5005* (2013.01); *G06F 9/5022* (2013.01); *G06F 15/163* (2013.01)

(58) Field of Classification Search
CPC ........ G06F 9/4881; G06F 9/50; G06F 9/5005; G06F 9/5022

See application file for complete search history.

(56) References Cited

U.S. PATENT DOCUMENTS

| | | | | |
|---|---|---|---|---|
| 2009/0064152 | A1* | 3/2009 | Eichenberger | G06F 9/3885 718/102 |
| 2009/0157969 | A1* | 6/2009 | Harding | G06F 12/0842 711/E12.039 |
| 2011/0296148 | A1* | 12/2011 | Cain, III | G06F 9/3004 712/228 |
| 2015/0121387 | A1* | 4/2015 | Chang | G06F 9/4881 718/103 |
| 2015/0121391 | A1* | 4/2015 | Wang | G06F 9/5044 718/104 |
| 2018/0189105 | A1* | 7/2018 | Sanghvi | G06F 9/5027 |
| 2019/0324801 | A1* | 10/2019 | Kaveri | G06F 9/485 |

OTHER PUBLICATIONS

CN202011624931.0—First Office Action mailed on Feb. 28, 2025, 27 pages.
Zhao et al., "Operating System Principles and Applications", Beijing University of Posts and Telecommunications Press, May 31, 2012, 13 pages.
CN202011624932.5—First Office Action mailed on Aug. 16, 2023, 9 pages. (With Brief English Explanation).
Zhao et al., "Computer Operation System", Xidian University Press, Sep. 30, 2018, 12 Pages. (With Brief English Explanation).

* cited by examiner

INTER-CHIP COMMUNICATION CIRCUIT, METHOD AND SYSTEM

CROSS REFERENCE OF RELATED APPLICATIONS

The present application is a 371 of international Application PCT/CN2021/143162, filed Dec. 30, 2021, which claims priority to: Chinese Patent Application No. 2020116316832 with the title of "Inter-chip Communication Circuit, Method and System" filed on Dec. 31, 2020; Chinese Patent Application No. 2020116249310 with the title of "Inter-chip Communication Circuit, Method and System" filed on Dec. 31, 2020; and Chinese Patent Application No. 2020116249325 with the title of "Method for Data Transmission and Related Products" filed on Dec. 31, 2020. The contents of the applications are incorporated herein by reference in their entireties.

TECHNICAL FIELD

The present disclosure relates to the field of artificial intelligence chip, and in particular the present disclosure relates to the field of inter-chip communication of a multiprocessor.

BACKGROUND

During neural network training, if consuming time for training a neural network with a size of X by a single machine is T, when there are N identical machines to train the neural network, in an ideal state, training time should be T/N, which is also known as ideal linear speedup. However, the ideal linear speedup is unpractical because of communication overheads. Although a computing part may be accelerated linearly, a communication part (such as an AllReduce algorithm) is objective and may not be eliminated.

Therefore, to improve computing power and running efficiency of a chip, efficiency of inter-chip communication is required to be improved.

SUMMARY

One purpose of the present disclosure is to improve efficiency of inter-chip communication, so as to improve computation efficiency of a multi-core processor.

A first aspect of the present disclosure provides a circuit for inter-chip communication, which includes a first scheduling unit, a first computation unit and a sending unit. The first scheduling unit is configured to receive first task description information; the first computation unit is configured to receive the first task description information from the first scheduling unit and process first data according to the first task description information to obtain first processed data; the first computation unit is further configured to send the first processed data to the sending unit; and the sending unit is configured to send the first processed data off-chip.

A second aspect of the present disclosure provides a method for inter-chip communication, including: receiving first task description information through a first scheduling unit; processing first data according to the first task description information through a first computation unit to obtain first processed data; sending the first processed data to a sending unit through the first computation unit; and sending the first processed data off-chip through the sending unit.

A third aspect of the present disclosure provides a circuit for inter-chip communication, which includes a second scheduling unit, a second computation unit, a receiving unit and a second storage unit. The receiving unit is configured to: receive first processed data; send the first processed data to the second storage unit; notify the second scheduling unit that the first processed data is received; the second scheduling unit is configured to: receive second task description information; instruct the second computation unit to process the first processed data; and the second computation unit is configured to: acquire the first processed data from the second storage unit; receive the second task description information from the second scheduling unit; and process the first processed data according to the second task description information to obtain second processed data.

A fourth aspect of the present disclosure provides a chip, including the circuit described above.

A fifth aspect of the present disclosure provides an electronic device, including the circuit or the chip described above.

A sixth aspect of the present disclosure provides an inter-chip communication system, which includes a first chip and a second chip. The first chip includes a first scheduling unit, a first computation unit, and a sending unit. The first scheduling unit is configured to receive first task description information; the first computation unit is configured to receive the first task description information from the first scheduling unit and process first data according to the first task description information to obtain first processed data; the first computation unit is further configured to send the first processed data to the sending unit; the sending unit is configured to send the first processed data to the second chip; the second chip includes a second scheduling unit, a second computation unit, a receiving unit, and a second storage unit. The receiving unit is configured to receive the first processed data from the first chip; send the first processed data to the second storage unit; notify the second scheduling unit that the first process data is received; the second scheduling unit is configured to: receive second task description information; instruct the second computation unit to process the first processed data; and the second computation unit is configured to: acquire the first processed data from the second storage unit; receive the second task description information from the second scheduling unit; and process the first processed data according to the second task description information to obtain second processed data.

A seventh aspect of the present disclosure provides an electronic device, including the above-mentioned system.

Technical solutions of the present disclosure improve inter-chip communication efficiency by changing data retransmission rules in the chips, thereby improving whole running efficiency of the chips.

An eighth aspect of the present disclosure provides a method for task scheduling in an inter-chip communication circuit. The inter-chip communication circuit includes a first scheduling unit and a first computation unit. The method includes: receiving first task description information from the first scheduling unit through the first computation unit, and executing a first task according to the first task description information; at the first computation unit, suspending the first task in response to a case where a first specific event happens; and at the first computation unit, executing a second task in response to suspending the first task.

A ninth aspect of the present disclosure provides a method for task scheduling in an inter-chip communication circuit. The inter-chip communication circuit includes a second scheduling unit, a second computation unit, and a second storage unit. The method includes: receiving third task description information from the second scheduling unit through the second computation unit; extracting to-be-processed data from the second storage unit through the second computation unit, and executing a third task on the to-be-processed data according to the third task description information; at the second computation unit, suspending the third task in response to a case where a second specific event happens; and at the second computation unit, executing a fourth task in response to suspending the third task.

A tenth aspect of the present disclosure provides a circuit for inter-chip communication, which includes a first scheduling unit and a first computation unit. The first computation unit is configured to: receive first task description information from the first scheduling unit, and execute a first task according to the first task description information; suspend the first task in response to a case where a first specific event happens; and execute a second task in response to suspending the first task.

An eleventh aspect of the present disclosure provides a circuit for inter-chip communication, which includes a second scheduling unit, a second computation unit, and a second storage unit. The second computation unit is configured to: receive third task description information from the second scheduling unit; extract to-be-processed data from the second storage unit, and execute a third task on the to-be-processed data according to the third task description information; suspend the third task in response to a case where a second specific event happens; and execute a fourth task in response to suspending the third task.

A twelfth aspect of the present disclosure provides a chip, including the above circuit.

A thirteenth aspect of the present disclosure provides a system for inter-chip communication, including a first chip and a second chip.

A fourteenth aspect of the present disclosure provides an electronic device, including the above chip or system.

One purpose of the present disclosure is to overcome limited chip throughput caused by network latency in the prior art.

A fifteenth aspect of the present disclosure provides a method for data transmission, including: sending a first instructing signal to a first scheduling unit according to data transmission from a first computation unit to a sending unit to release computation resources of the first computation unit; sending a second instructing signal to the first scheduling unit according to a feedback signal sent by the sending unit for the data transmission to release task resources of the first computation unit.

A sixteenth aspect of the present disclosure provides a circuit for data transmission, where the circuit includes: a first instructing sending unit, which is configured to send a first instructing signal to a first scheduling unit according to data transmission from a first computation unit to a sending unit to release computation resources of the first computation unit; and a second instructing sending unit, which is configured to send a second instructing signal to the first scheduling unit according to a feedback signal sent by the sending unit for the data transmission to release task resources of the first computation unit.

A seventeenth aspect of the present disclosure provides a system for data transmission, including: a first scheduling unit, a first computation unit, a sending unit, and a monitor unit. The first computation unit is configured to send data to the sending unit; the monitor unit is configured to monitor data transmission from the first computation unit to the sending unit, and send a first instructing signal to the first scheduling unit according to the data transmission from the first computation unit to the sending unit; the first scheduling unit is configured to instruct the first computation unit to release computation resources according to the first instructing signal; the sending unit is configured to receive the data transmitted from the first computation unit and send a feedback signal in response to receiving the data; the monitor unit is further configured to send a second instructing signal to the first scheduling unit according to the feedback signal; and the first scheduling unit is further configured to instruct the first computation unit to release task resources according to the second instructing signal.

An eighteenth aspect of the present disclosure provides a method for data transmission, including: sending data to a sending unit through a first computation unit; monitoring data transmission from the first computation unit to the sending unit, and sending a first instructing signal to a first scheduling unit according to the data transmission from the first computation unit to the sending unit; instructing the first computation unit to release computation resources through the first scheduling unit according to the first instructing signal; receive the data from the first computation unit through the sending unit, and sending a feedback signal in response to receiving the data; sending a second instructing signal to the first scheduling unit according to the feedback signal; and instructing the first computation unit to release task resources according to the second instructing signal through the first scheduling unit.

A nineteenth aspect of the present disclosure provides a chip, including the above circuit or system.

A twentieth aspect of the present disclosure provides an electronic device, including the chip described above.

A twenty-first aspect of the present disclosure provides an electronic device, including: one or a plurality of processors; and a memory, where the memory stores a computer-executable instruction, and when the computer-executable instruction is run by the one or plurality of processors, the electronic device executes the above-mentioned method.

A twenty-second aspect of the present disclosure provides a computer-readable storage medium, on which a computer-executable instruction is stored, where the above-mentioned method is implemented when the computer-executable instruction is run by one or a plurality of processors.

One beneficial effect of the present disclosure is that the computation resources of the processor may be released quickly even in a network congestion condition, so as to be used for computation of other data.

BRIEF DESCRIPTION OF DRAWINGS

By reading the following detailed description with reference to drawings, the above and other objects, features and technical effects of exemplary embodiments of the present disclosure will become easier to understand. In the drawings, several embodiments of the present disclosure are shown in an exemplary but not a restrictive manner, and the same or corresponding reference numerals instruct the same or corresponding parts.

DETAILED DESCRIPTION OF EMBODIMENTS

Technical solutions in embodiments of the present disclosure will be described clearly and completely hereinafter with reference to drawings in the embodiments of the present disclosure. Obviously, embodiments to be described are merely some rather than all embodiments of the present disclosure. All other embodiments obtained by those skilled in the art based on the embodiments of the present disclosure without creative efforts shall fall within the scope of protection of the present disclosure.

It should be understood that terms such as "first", "second", "third", and "fourth" that appear in the claims, the specification, and the drawings are used for distinguishing different objects rather than describing a specific order. It should be understood that terms "including" and "comprising" used in the specification and the claims instruct the presence of a feature, an entity, a step, an operation, an element, and/or a component, but do not exclude the existence or addition of one or more of other features, entities, steps, operations, elements, components, and/or collections thereof.

It should also be understood that terms used in the specification of the present disclosure are merely intended to describe a specific embodiment rather than to limit the present disclosure. As being used in the specification and the claims of the present disclosure, unless the context clearly instructs, otherwise, singular forms such as "a", "an", and "the" are intended to include plural forms. It should also be understood that a term "and/or" used in the specification and the claims refers to any and all possible combinations of one or more of relevant listed items and includes these combinations.

The above has described the embodiments of the present disclosure in detail. Specific examples have been used in the present disclosure to explain the principles and implementations of the present disclosure. The descriptions of the above embodiments are only used to facilitate understanding of the method and core ideas of the present disclosure. Simultaneously, persons of ordinary skill in the art may change or transform the specific implementations and application scope of the present disclosure according to the ideas of the present disclosure. The changes and transformations shall all fall within the protection scope of the present disclosure. In summary, the content of this specification should not be construed as a limitation on the present disclosure.

Figure 1:
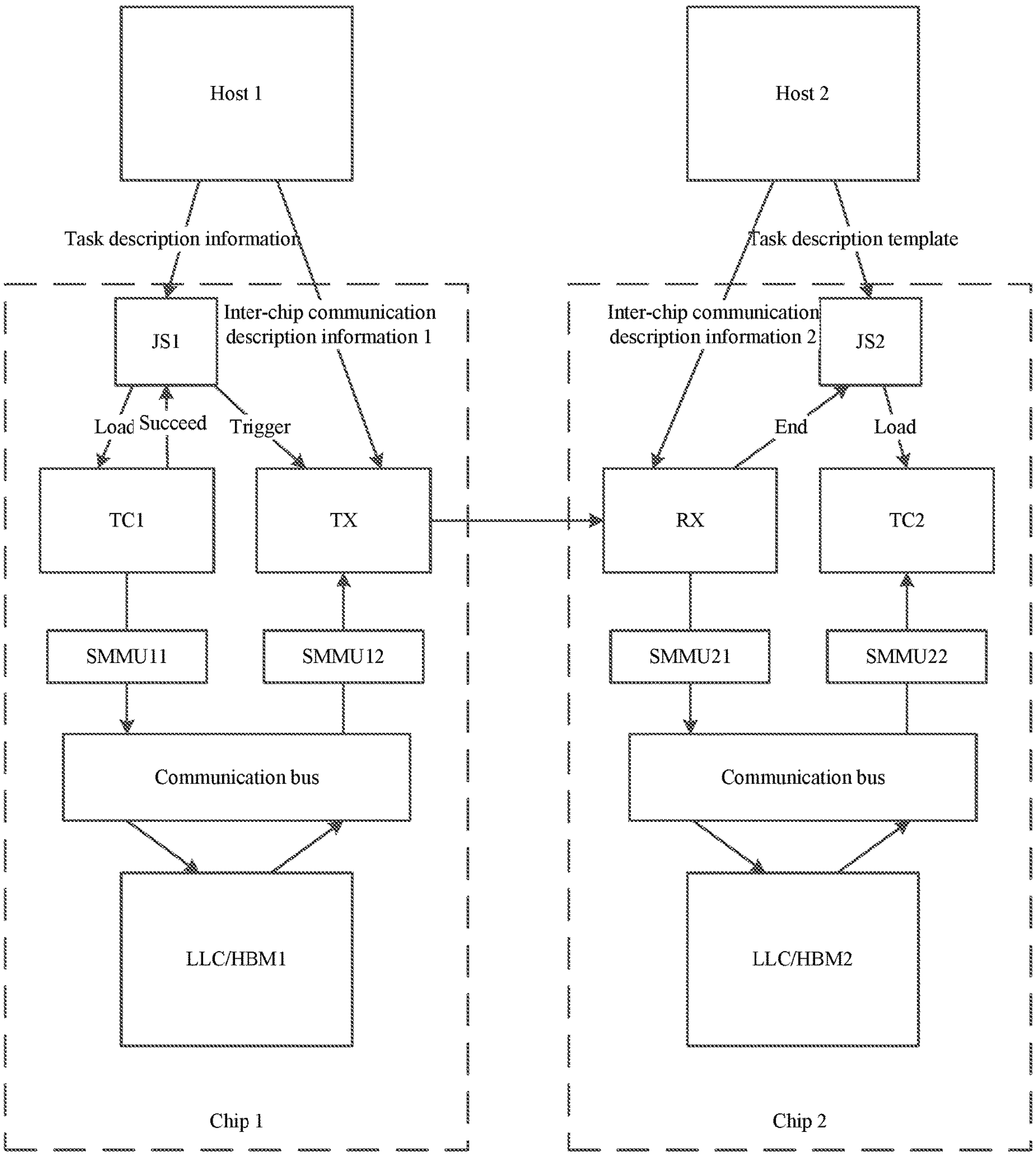
FIG. 1 is a schematic diagram of a system for inter-chip communication according to an embodiment of the present disclosure.

FIG. 1 is a schematic diagram of a system for inter-chip communication according to an embodiment of the present disclosure.

As shown in FIG. 1, the system includes a chip 1 and a chip 2, where the chip 1 includes a first scheduling unit JS (job scheduler)1, a first computation unit TC1, a sending unit TX, a first memory management sub-unit (SMMU) 11, a second memory management sub-unit (SMMU) 12, and a first storage unit LLC (last level cache)/HBM1 (high bandwidth memory); and the chip 2 includes a second scheduling unit JS2, a second computation unit TC2, a receiving unit RX, a third memory management sub-unit (SMMU) 21, a fourth memory management sub-unit (SMMU) 22, and a second storage unit LLC/HBM2.

The computation units TC1 and TC2 may be every kinds of processing core, such as an image processing unit (IPU), and the like.

As shown by FIG. 1, the first scheduling unit JS1 receives task description information (such as a task descriptor) from a host 1. The task description information includes a task identifier (ID), a task category, a data size, a data address, a parameter size, configuration information of the processing core (such as the first computation unit), address information of the processing core, splitting information of the task, and the like. It needs to be understood that when information is received from the host for the first time, to-be-processed data is also received from the host. In a running process, data may be transmitted between the chips. The first scheduling unit JS1 only receives the task description information but not needs to receive the to-be-processed data each time.

The first scheduling unit JS1 loads the received task description information to the first computation unit TC1. After receiving the loaded task descriptor, the first computation unit TC1 feeds back a response to the first scheduling unit JS1 to instruct a successful reception.

The first computation unit TC1 may split the task into multiple jobs according to the task description information, and distribute task scheduling to at least one processing core of the first computation unit according to granularity of the split job to make at least one processing core of the first computation unit process the task in parallel.

After processing the received data, the first computation unit TC1 may further store the processed data to the first storage unit LLC/HBM1 through a communication bus. The first memory management sub-unit (SMMU) 11 is responsible for implementing memory allocation and address conversion in the first storage unit LLC/HBM1.

Next, the sending unit TX obtains the processed data from the first storage unit LLC/HBM1 through the second memory management unit (SMMU) 12, and triggered by the first scheduling unit JS1, the sending unit TX transfers the processed data to the chip 2 based on first inter-chip communication description information 1 received from the host 1. The inter-chip communication description information 1 is used to describe a communication task between the chips.

The receiving unit RX in the chip 2 receives the processed data from the sending unit of the chip 1 based on second inter-chip communication description information 2 received from the host, and stores the received processed data to the second storage unit LLC/HBM2 of the chip 2 via the communication bus through the third memory management sub-unit (SMMU) 21.

After receiving the processed data, the receiving unit notifies the second scheduling unit JS2. The second scheduling unit JS2 receives a task description template from a host 2, where the task description template is relevant to the second inter-chip communication description information sent by the host 1, and determines the communication task according to the second inter-chip communication description information and the task description template.

A second processing unit TC2 obtains the stored processed data from the second storage unit LLC/HBM2 through a fourth memory management unit SMMU22 and processes the stored processed data.

In a scheme shown in FIG. 1, the sending unit TX, relative to the first computation unit TC1, is in a master control position. The sending unit is responsible for extracting data from the first storage unit LLC/HBM1 and sending the data off-chip without being controlled by the first computation unit TC1.

In the scheme shown in FIG. 1, the data is required to be cached and read inside the chip, and then be sent and processed. Time for cache and read may easily lead to latency of communication time, thereby leading to decreasing of processing capability of a multi-chip system.

Besides, fault or time overhead generated in reading data from the first storage unit LLC/HBM1 in the chip one may affect data transmission from the chip 1 to the chip 2 by the sending unit TX, leading to long time waiting of the chip 2.

Figure 2:
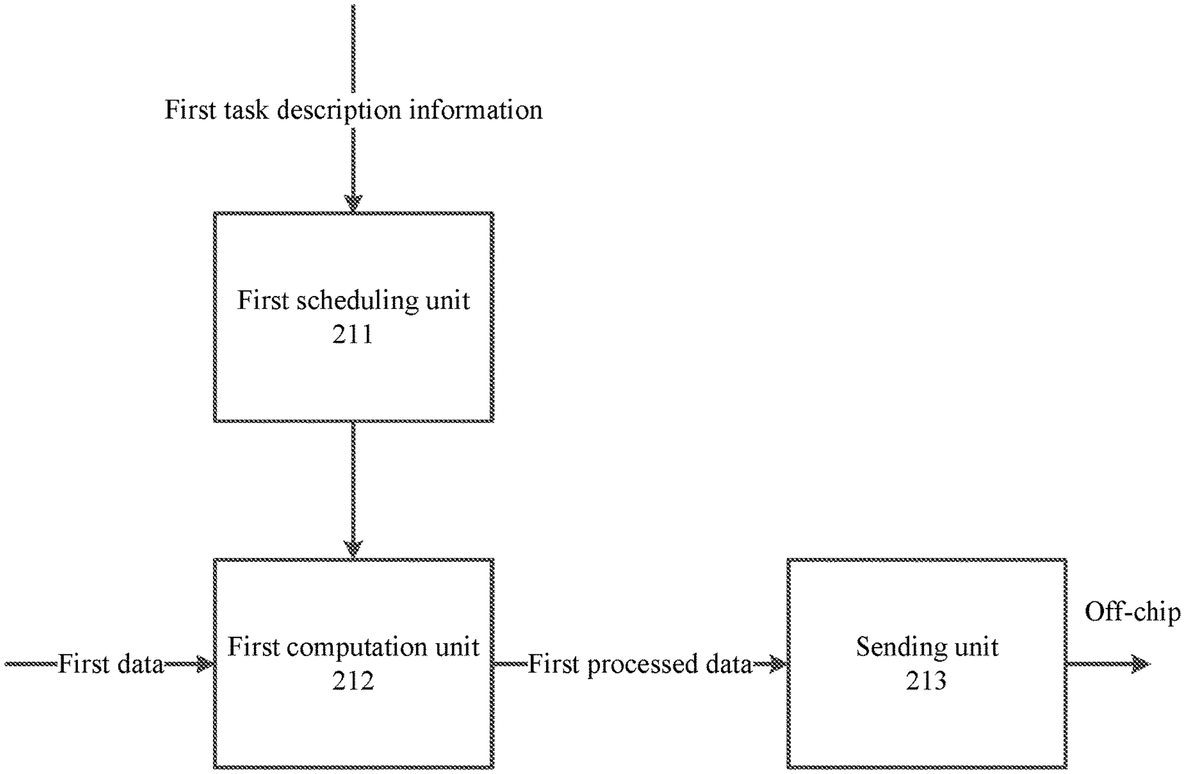
FIG. 2 is a schematic diagram of a circuit for inter-chip communication according to an embodiment of the present disclosure.

FIG. 2 is a schematic diagram of a circuit for inter-chip communication according to an embodiment of the present disclosure. As shown in FIG. 2, the circuit includes: a first scheduling unit 211, a first computation unit 212, and a sending unit 213, where the first scheduling unit 211 is configured to receive the first task description information; the first computation unit 212 is configured to receive the first task description information from the first scheduling unit 211, and process first data according to the first task description information to obtain first processed data; the first computation unit 212 is further configured to send the first processed data to the sending unit 213; and the sending unit 213 is configured to send the first processed data off-chip.

Different from the system shown in FIG. 1, in a system shown in FIG. 2, the first scheduling unit 211 is only responsible for sending the first task description information to the first computation unit 212, but not responsible for scheduling and controlling the sending unit 213.

The first computation unit 212 receives the first task description information and process the first data according to the first task description information. The processed first data may be directly sent to the sending unit 213, and the sending unit 213 is not required to obtain the processed data from the storage unit.

In this embodiment, the sending unit 213 is not in the master control position, but sends data under the control of the first computation unit 212. In another embodiment, the sending unit 213, under the control of the first computation unit 212, sends the first processed data in response to receiving the first processed data. In this embodiment, a responsibility of the sending unit is relatively unitary, so that a function and/or a structure of the sending unit 213 may be simplified.

Further, in embodiments in FIG. 1, the host directly sends the inter-chip communication description information to the sending unit 213. The sending unit 213 interacts with receiving units and sending units on other chips according to the inter-chip communication description information received from the host. In embodiments shown in FIG. 2, the communication of the sending unit 213 is directly controlled by the first computation unit 212. In other words, the first computation unit 212 may include the inter-chip communication description information, so as to easily control the communication between the sending unit 213 and external devices.

The first data may derive from the host, or may derive from data generated after processing by other chips.

Figure 3:
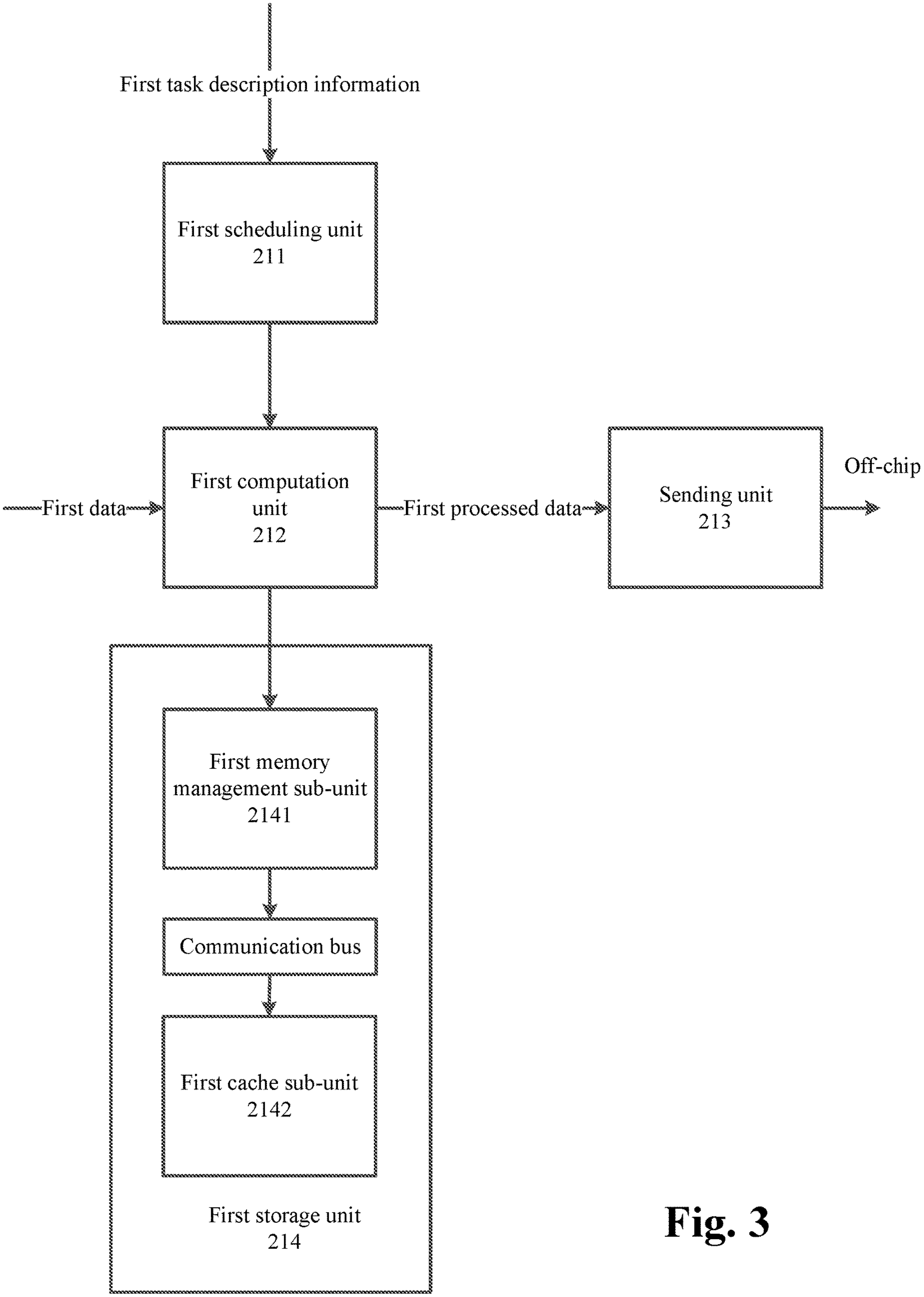
FIG. 3 is a schematic diagram of a circuit for inter-chip communication according to an embodiment of the present disclosure.

FIG. 3 is a schematic diagram of a circuit for inter-chip communication according to an embodiment of the present disclosure.

As shown in FIG. 3, the circuit of the present disclosure further includes a first storage unit 214. The first computation unit 212 is further configured to send the first processed data to the first storage unit 214, so as to cache the first processed data.

In the above technical solutions of the present disclosure, the first computation unit 212 not only sends the first processed data to the sending unit 213, but also sends the first processed data to the first storage unit 214 for storage to facilitate further use of the first processed data.

According to an embodiment of the present disclosure, the first storage unit may include a first memory management sub-unit 2141 and a first cache sub-unit 2142. The first memory management sub-unit 2141 is configured to manage storage of the first processed data on the first cache sub-unit 2142. The first memory management sub-unit 2141 is responsible for realizing functions such as memory allocation, address conversion, and the like in the storage unit. The first cache sub-unit 2142 may be an on-chip cache, which is responsible for caching the data processed by the first computation unit 212.

It may be seen that compared with the embodiment shown in FIG. 1, in the embodiment shown in FIG. 3, the sending unit 213 does not read data from the first cache sub-unit 2142, but directly sends the first processed data received from the first computation unit 212 to other chips.

Such a method decreases or eliminates time overhead generated by reading data from the first cache sub-unit 2142 by the sending unit 213, thereby improving communication efficiency.

Besides, the sending unit 213 does not need to obtain data from the first cache sub-unit 2142, so a new memory management sub-unit is not required to be called, which is apparently different from what is shown in FIG. 1 that two memory management sub-units are used to store and read data.

Figure 4:
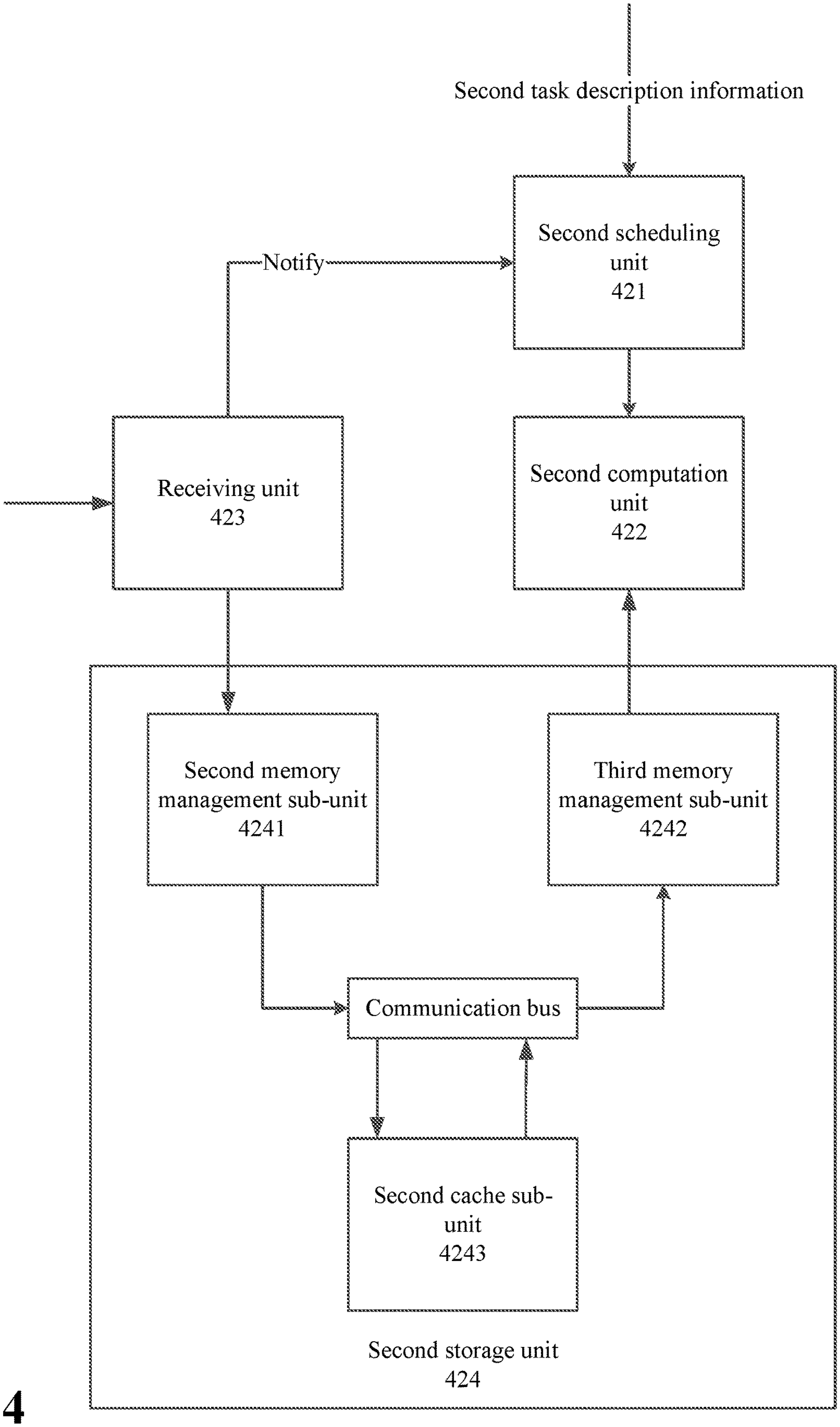
FIG. 4 is a schematic diagram of a circuit for inter-chip communication according to an embodiment of the present disclosure.

FIG. 4 is a schematic diagram of a circuit for inter-chip communication according to an embodiment of the present disclosure.

As shown in FIG. 4, the circuit may include: a second scheduling unit 421, a second computation unit 422, a receiving unit 423, and a second storage unit 424.

The receiving unit 423 may receive data outside the circuit, and send the data to the second storage unit 424 for cache. Meanwhile, the receiving unit 423 may notify the second scheduling unit 421 that the data is received, so that the second scheduling unit 421 knows that the data enters into the circuit (chip).

The second scheduling unit 421 may receive second task description information, which instructs the second computation unit 422 to process the data received by the receiving unit 423. The second task description information may be received from the host, and the received second task description information may be loaded to the second computation unit 422.

The second task description information may be independent from the above-mentioned first task description information, or may be correlated to the first task description information. For example, the first task description information and the second task description information may be two different parts of one piece of task description information.

The second computation unit 422 may be configured to acquire the data from the second storage unit 424, where the data is received by the receiving unit 423 and is stored in the second storage unit 424, and the second computation unit 422 receives the second task description information from the second scheduling unit 421; and after receiving the second task description information and the data, the second computation unit 422 may process the first processed data according to the second task description information to obtain second processed data.

In the embodiment shown in FIG. 1, the host needs to send the inter-chip communication description information to the receiving unit RX to control reception and retransmission of the receiving unit RX on the data. However, the difference from the embodiment shown in FIG. 1 is that, in the embodiment shown in FIG. 4, the receiving unit 423 does not need to receive the inter-chip description information from the host, but only need to notify the second scheduling unit 421 that the data is received.

Further, in the embodiment shown in FIG. 1, the receiving unit RX, as a subordinate part, is controlled by the host; but in the embodiment shown in FIG. 4, the receiving unit 423 executes operations such as data reception, notification, storage and the like as a master control.

According to an embodiment of the present disclosure, the second storage unit 424 may include a second memory management sub-unit 4241, a third memory management sub-unit 4242, and a second cache sub-unit 4243.

In FIG. 4, the second memory management sub-unit 4241 may manage storage of data from the receiving unit 423 to the second cache sub-unit 4243.

The third memory management sub-unit 4242 may manage data transmission from the second cache sub-unit 4243 to the second computation unit 422.

The circuits shown in FIG. 2 to FIG. 4 may be formed in the chip, or in other devices.

Figure 5:
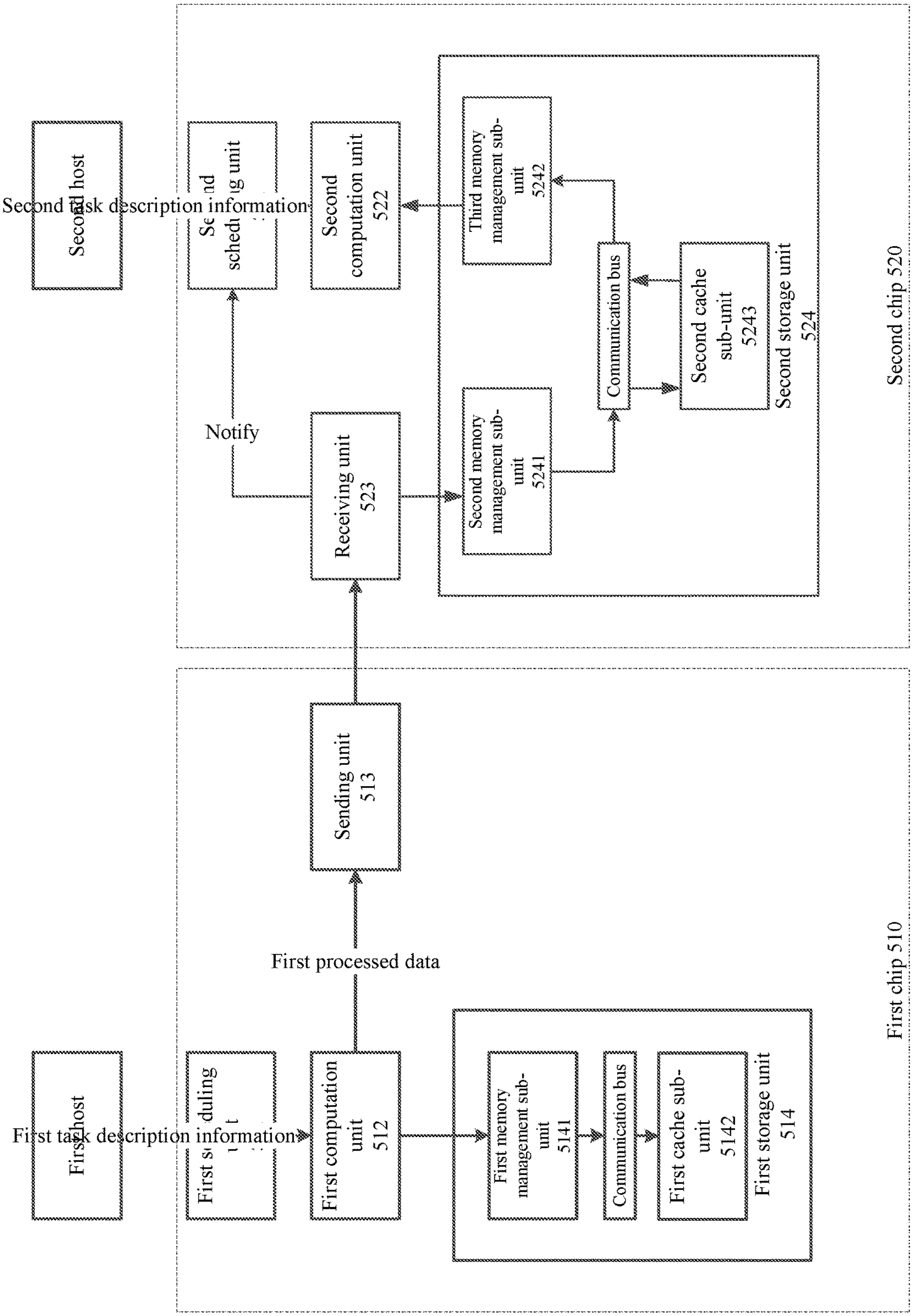
FIG. 5 is a schematic diagram of a system for inter-chip communication according to an embodiment of the present disclosure.

FIG. 5 is a schematic diagram of a system for inter-chip communication according to an embodiment of the present disclosure.

As shown in FIG. 5, the inter-chip communication system of the present disclosure may include a first chip 510 and a second chip 520, where the first chip 510 may include a first scheduling unit 511, a first computation unit 512, and a sending unit 513; and the second chip 520 may include a second scheduling unit 521, a second computation unit 522, a receiving unit 523, and a second storage unit 524.

In the system shown in FIG. 5, the first scheduling unit 511 receives the first task description information. For example, the first scheduling unit 511 may receive the first task description information from the first host.

The first computation unit 512 may receive the first task description information from the first scheduling unit 511, and process the first data according to the first task description information to obtain the first processed data.

In FIG. 5, the first data may be received from the first host by the first scheduling unit 511, or may be directly or indirectly received from other chips. The present disclosure does not limit a source of the first data. For example, in a first start or initialization of the system, the first scheduling unit 511 may receive the first data along with the first task description information from the first host. After entering into the system shown in FIG. 5, the first data may be processed by each chip.

The first processed data may be generated after the first computation unit 512 processes the first data according to the first task description information. Then, the first computation unit 512 may directly send the generated first processed data to the sending unit 513, so as to send the first processed data to the second chip 520.

Optionally, the first chip 510 may further include a first storage unit 514. The first computation unit 512 is further configured to send the first processed data to the first storage unit 514, so as to cache the first processed data.

Before, meanwhile or after the first processed data is sent to the sending unit 513 by the first computation unit 512, the first processed data may be cached to the first storage unit 514 through the communication bus for further usage. If the first processed data needs to be called in the future, corresponding data may be read from the first storage unit 514, instead of being received from the first host.

The first storage unit 514 may include a first memory management sub-unit 5141 and a first cache sub-unit 5142. The first storage unit 510 may manage storage of the first processed data on the first cache sub-unit 5142 through the first memory management sub-unit 5141.

After receiving the first processed data, the sending unit 513 may send the first processed data to the second chip 520. In the embodiment shown in FIG. 1, the sending unit TX plays a role of master control, but the difference from the embodiment shown in FIG. 1 is that, in this embodiment, the sending unit 513 is controlled by the first computation unit 512, and does not play a role of master control.

The receiving unit 523 in the second chip 520 may receive the first processed data from the first chip 510 (specifically, the sending unit 513 in the first chip 510).

After receiving the first processed data, the receiving unit 523 sends the first processed data to the second storage unit 524, and notifies the second scheduling unit 521 that the first processed data is received.

The second scheduling unit 521 receives the second task description information. The second task description information is independent from the first task description information, or may be correlated with the first task description information. For example, the first task description information and the second task description information may be different sub-tasks in a same overall task.

Next, the second scheduling unit 521 may instruct the second computation unit 522 to execute additional processing on the first processed data according to the second task description information. It needs to be understood that "instruct the second computation unit 522 to execute additional processing on the first processed data" means that the second scheduling unit 521 sends a start processing instruction to the second computation unit 522, but does not mean that the second scheduling unit 521 needs to send the first processed data to the second computation unit 522.

The second computation unit 522 may receive the second task description information from the second scheduling unit 521, obtain the first processed data from the second storage unit 524, and process the first processed data according to the second task description information to obtain the second processed data.

The second storage unit 524 may include a second memory management sub-unit 5241, a third memory management sub-unit 5242, and a second cache sub-unit 5243. The second memory management sub-unit 5241 may manage storage of the first processed data from the receiving unit 523 to the second cache sub-unit 5243. The third memory management sub-unit 5242 may manage data transmission from the second cache sub-unit 5243 to the second computation unit 522.

In the system shown in FIG. 5, the receiving unit 523 does not need to receive communication task description information from the second host, but may directly receive the first processed data from the first chip 510.

It needs to be understood that for clear description, when the first chip 510 only plays a data sending role, the first chip 510 includes the sending unit 513, and when the second chip 520 only plays a data receiving role, the second chip 520 includes the receiving unit 523. However, in practical application and products, the sending unit 513 and the receiving unit 523 are usually combined to one receiving-sending unit, which is responsible for both receiving and sending. Therefore, although the sending unit 513 and the receiving unit 523 are two different entities in the present disclosure, the sending unit 513 and the receiving unit 523 are the same entity in the practical application and products essentially.

Besides, the first computation unit 512 and the second computation unit 522 may be the same computation unit, the first scheduling unit 511 and the second scheduling unit 521 may be the same scheduling unit, and the first storage unit 514 and the second storage unit 524 may be the same storage unit. These units just behave differently when the units play a data sending role or a data receiving role in the chips. For example, the first storage unit 514 may have a same internal structure with the second storage unit 524 actually. In other words, the first chip 510 and the second chip 520 have the same structure, and the chips are not structurally different in mass production.

Figure 6:
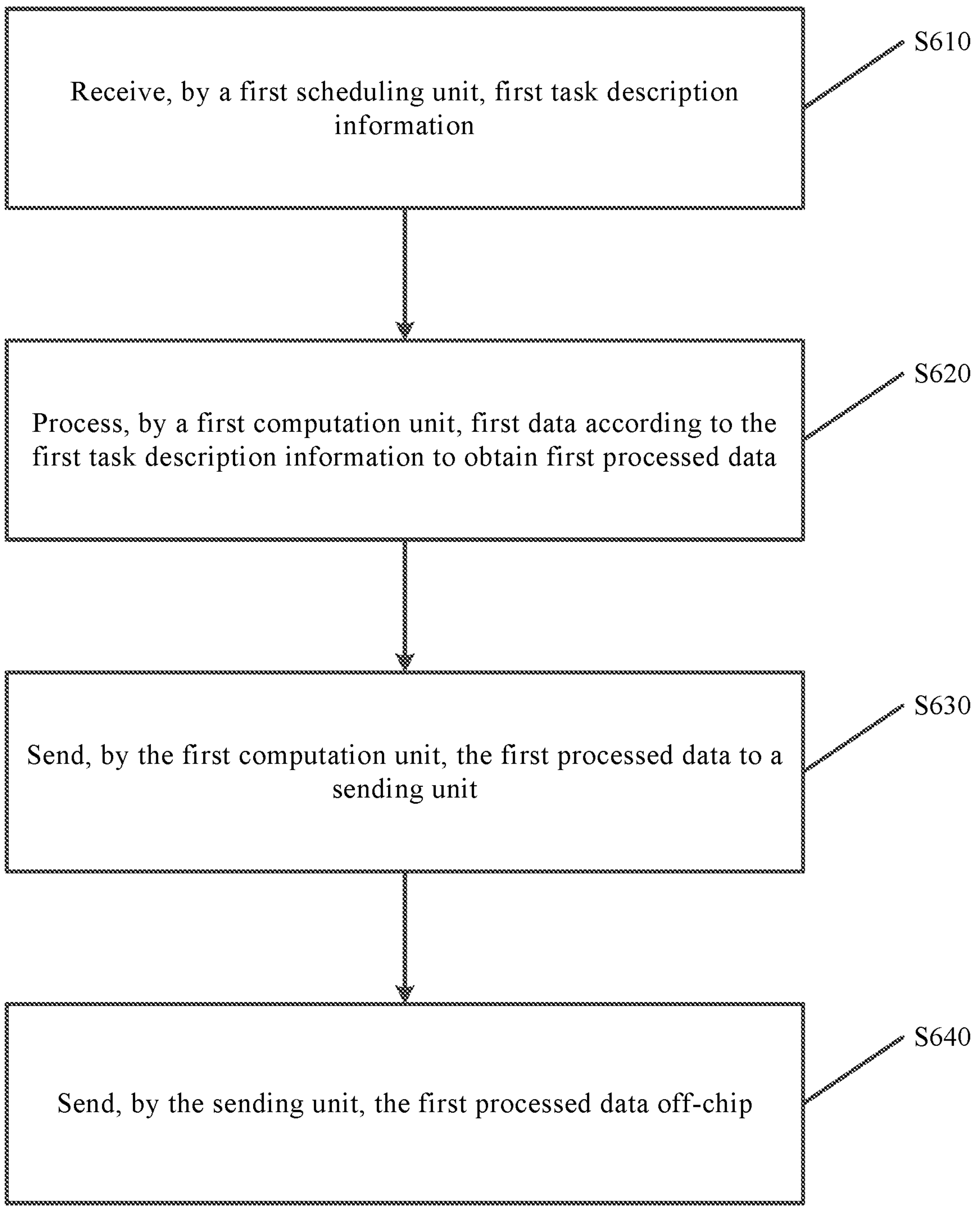
FIG. 6 is a method for inter-chip communication according to an embodiment of the present disclosure.

FIG. 6 is a method for inter-chip communication according to an embodiment of the present disclosure. The method includes: in an operation S610, receiving, by the first scheduling unit, the first task description information; in an operation S620, processing, by the first computation unit, the first data according to the first task description information to obtain the first processed data; in an operation S630, sending, by the first computation unit, the first processed data to the sending unit; and in an operation S640, sending, by the sending unit, the first processed data off-chip, where the first data derives from the host or the first storage unit.

According to an embodiment of the present disclosure, the method may further include sending the first processed data to the first storage unit through the first computation unit to cache the first processed data.

According to an embodiment of the present disclosure, the first storage unit includes the first memory management sub-unit and the first cache sub-unit. The method further includes: managing the storage of the first processed data on the first cache sub-unit through the first memory management sub-unit.

According to an embodiment of the present disclosure, the method further includes: receiving the first task description information from the host through the first scheduling unit.

Besides, in the prior art, only after a task kernel of an existing task is executed, the existing task may release a usage right of the computation unit, leading to wasting of the computation resources of the computation unit. Based on this, embodiments of the present disclosure provide a task scheduling method based on the above inter-chip communication circuit.

Figure 9A:
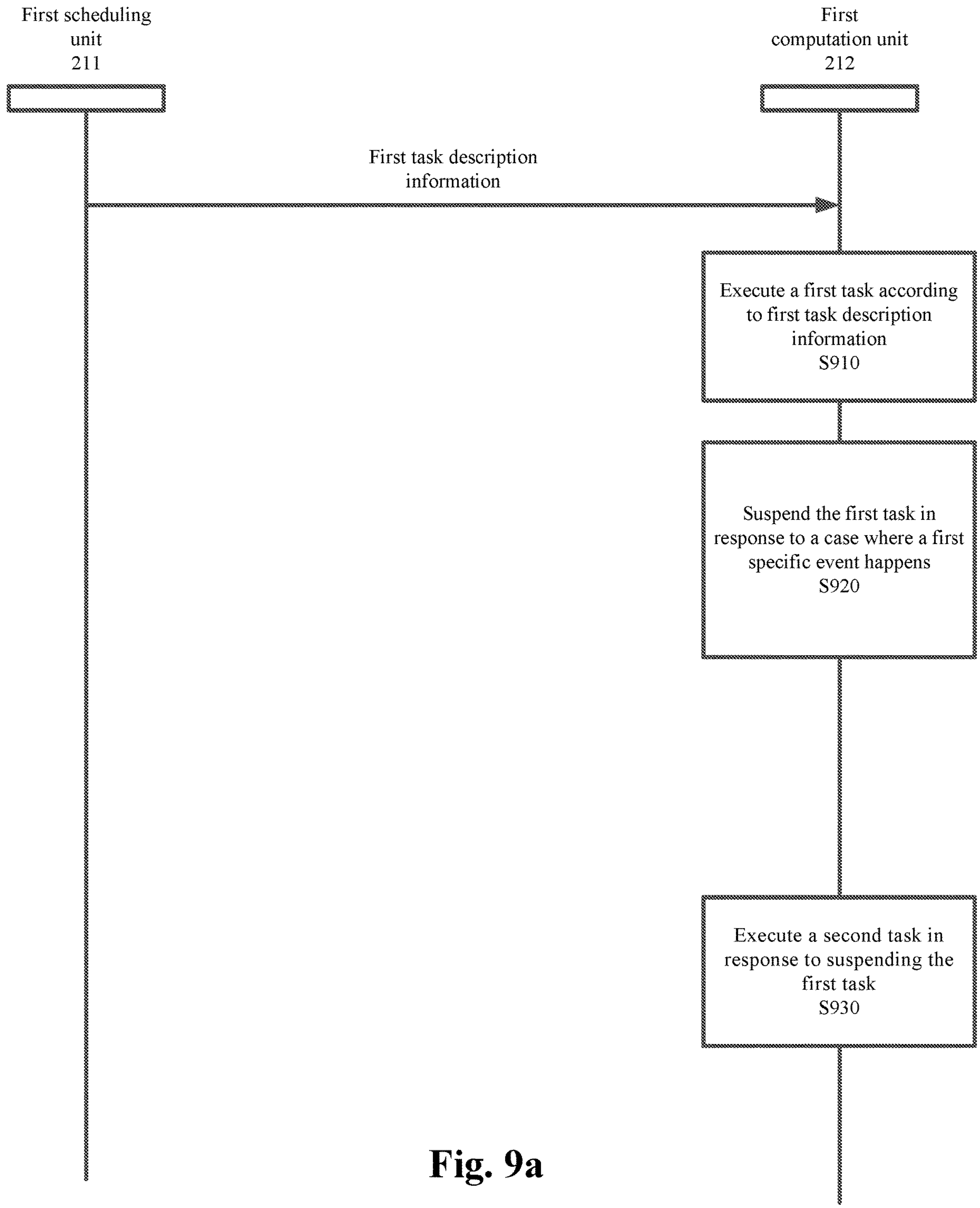
FIG. 9*a* and FIG. 9*b* show a method for inter-chip communication in an inter-chip communication circuit according to an embodiment of the present disclosure.

FIG. 9*a* shows a method for task scheduling in an inter-chip communication circuit according to an embodiment of the present disclosure. The following may describe the method of FIG. 9 in detail in combination with FIG. 2 to FIG. 3.

As shown in FIG. 9*a*, the inter-chip communication circuit may include the first scheduling unit 211 and the first computation unit 212 (as shown in FIG. 2 and FIG. 3). The method includes: in an operation S910, receiving, by the first computation unit 212, the first task description information from the first scheduling unit 211, and executing the first task according to the first task description information; in an operation S920, at the first computation unit 212, suspending the first task in response to a case where a first specific event happens; and in an operation S930, at the first computation unit 212, executing the second task in response to suspending the first task.

Usually, the first computation unit 212 may receive one piece of task description information from the first scheduling unit 211, and execute tasks described in the first task description information, such as communication, computation, task loading, and the like.

When the first computation unit 212 executes the first task, the execution may be interrupted because of a specific event, so that the first computation unit 212 may suspend the interrupted task, and record a point at which the task is interrupted in the first computation unit 212 locally. Besides, the point at which the task is interrupted is recorded in the first scheduling unit 212, so that the first computation unit 212 and the first scheduling unit 211 may know where the task is interrupted.

In the prior art, if one task is interrupted, the first computation unit 212 may stop processing and wait for resuming of the task. For example, the first computation unit 212 may only release a usage right of the first computation unit 212 on the task kernel after executing of the task kernel, and the first computation unit 212 is always in a waiting condition until the executing of the task kernel is finished. Apparently, this may lead to computation resources wasting of the first computation unit 212.

In technical solutions of the present disclosure, after suspending one above task, the first computation unit 212 may start executing a new task instead of stopping working.

The new task may be stored in the first computation unit 212 in advance, so that after suspending the above task, the first computation unit 212 may obtain a new task locally and execute the new task. The new task may be scheduled by the first scheduling unit 211.

It needs to be understood that there is no necessary dependency between scheduling a new task from the first computation unit 212 by the first scheduling unit 211 and whether the first computation unit 212 suspends the above task. For example, before the first computation unit 212 suspends the above task, the first scheduling unit 211 may send a piece of new task description information to the first computation unit 212 first. Once the first computation unit 212 suspends the above task, the new scheduled task may be executed immediately.

In another embodiment, in a period of time before suspending the task, the first computation unit 212 may notify the first scheduling unit 211 that the task may be suspended in a specific period of time; therefore, after receiving the notification, the first scheduling unit 211 may send a new piece of task description information to the first computation unit 212 in this period of time. Once the first computation unit 212 suspends the above task, the new scheduled task may be executed immediately.

Figure 9B:
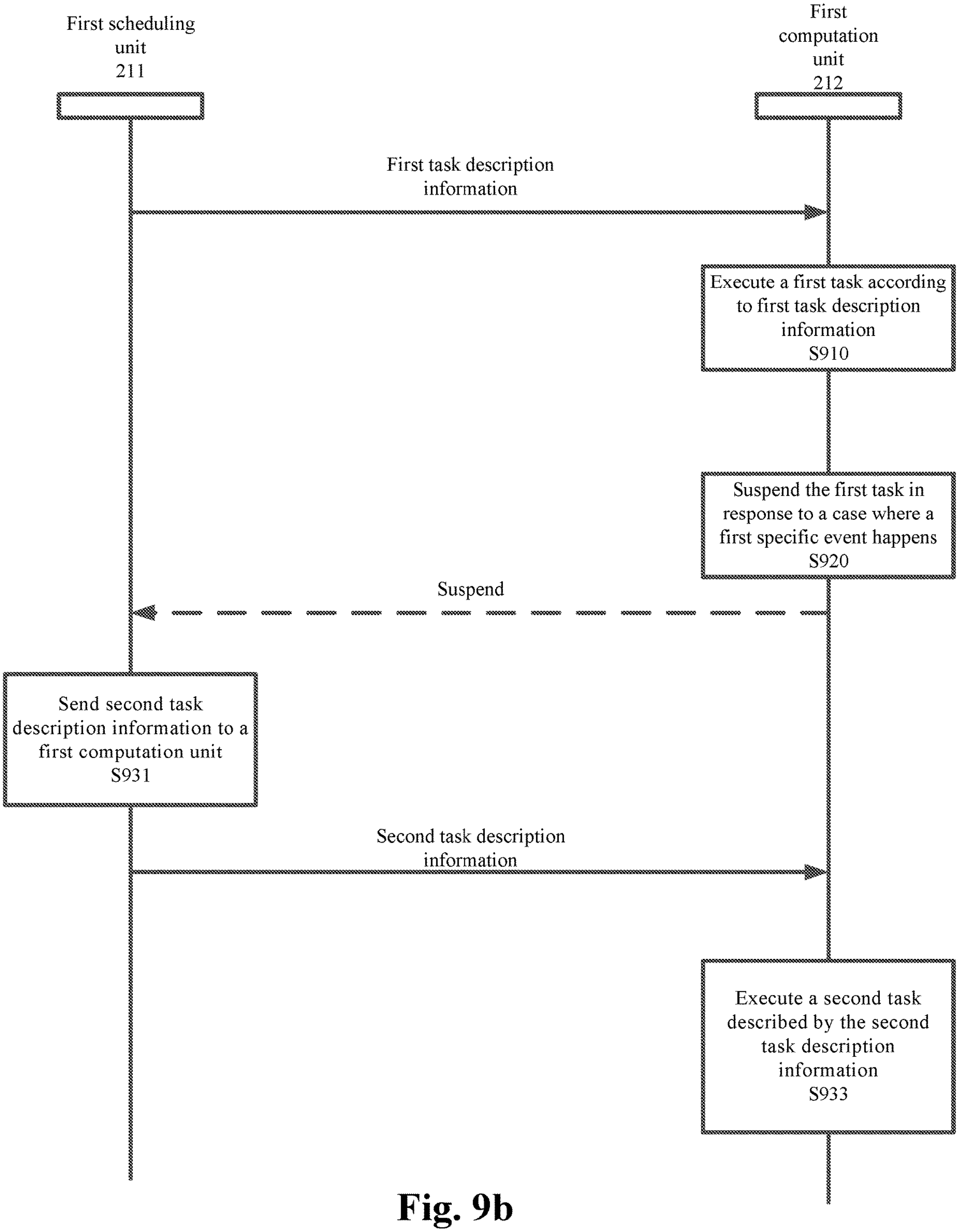

In another embodiment shown in FIG. 9*b*, an operation S930 may include: in an operation S931, at the first scheduling unit 211, sending the second task description information to the first computation unit 212 in response to suspending the first task by the first computation unit 212; and in an operation S933, at the first computation unit 212, executing the second task in response to receiving the second task description information.

In this embodiment, the first scheduling unit 211 may monitor whether the first computation unit 212 suspends one task, once the first scheduling unit 211 monitors that the first computation unit 212 suspends one task, to avoid computation resources wasting caused by work suspending of the first computation unit 212, the first scheduling unit 211 may schedule a new piece of task information to the first computation unit 212. Therefore, after suspending one task, the first computation unit 212 may start executing another task, thereby improving computation efficiency.

It needs to be understood that dotted lines in FIG. 9*b* represent that the notification of "suspending" may exist or not. In other words, scheduling a new task by the first scheduling unit does not necessarily depend on whether the first computation unit 211 suspends the above task. Besides, the above operation is not necessarily performed in the order instructed by the label, but the order of the above operation may be changed according to actual situations. For example, if the first scheduling unit 211 is required to send the second task description information to the first computation unit 212 after responding to suspending the first task by the first computation unit 212, the operation S931 is performed after the operation S920. However, if sending the second task description information by the first scheduling unit 211 to the first computation unit 212 does not depend on whether the first task is suspended by the first computation unit 212, the operation S931 may be executed before, after, or at the same time with the operation S920.

Further, as shown by FIG. 2 and FIG. 3, the inter-chip communication circuit may further include the sending unit 213. At the sending unit 213, the first computation unit receives the processed data and sends the processed data off-chip, where suspending the first task in response to a case where a first specific event happens includes: suspending the first task in response to a case where the sending of the processed data by the sending unit is blocked.

The sending unit 213 is responsible for sending data and information from one chip to another. However, a back pressure may occur when the sending unit 213 sends the data, which may cause the first computation unit 212 to stop processing the data. Data back pressure may occur in a variety of ways. For example, a channel to downstream chips may be blocked, so that the data or information may not be sent normally; the downstream chips are not sufficient in storage capacity and may not receive new data or information; or the downstream chips are not sufficient in processing capacity and may not further process the received new data or information. In the prior art, once the data back pressure occurs, the first computation unit 212 may suspend the work and wait for an end of the data back pressure; and after the data back pressure, the first computation unit restarts processing of the existing task. Apparently, such a work process may easily cause wasting of processing capacity. However, in technical solutions of the present disclosure, when there is the data back pressure at the sending unit 213, the first scheduling unit 211 instructs the first computation unit 212 to suspend the existing task, records the position where the task is interrupted, and instructs the first computation unit 212 to execute a new task. This may apparently improve efficiency of the first computation unit 212.

Further, as shown in FIG. 3, the inter-chip communication circuit may further include the first storage unit 214. The first storage unit 214 is configured to receive the processed data from the first computation unit 212 to cache the processed data, where suspending the first task in response to a case where a first specific event happens includes: suspending the first task in response to a case where the caching of the processed data by the first storage unit 214 is failed.

As described in combination with FIG. 3, the first processed data of the first computation unit 212 is not only sent to the sending unit 213, so as to be sent to other chips conveniently, but also sent to the first storage unit 214 for storage and further using.

The first storage unit 214 may not further store the data because of various reasons. For example, if a task has a large amount of data, the first storage unit 214 may not accommodate the large amount of data. In this circumstance, the first computation unit 212 may suspend working to wait for the data in the first storage unit 214 to be transmitted to other positions, and the first computation unit 212 may restart working on the same task when the first storage unit 214 is usable. It is unexpected to have unnecessary idle time in the first computation unit 212.

According to an embodiment of the present disclosure, as shown in FIG. 3, the first storage unit 214 may include the first memory management sub-unit 2141 and the first cache sub-unit 2142. The first memory management sub-unit 2141 is configured to manage storage of the processed data on the first cache sub-unit 2142; and the first task is suspended in response to a case where the caching of the processed data by at least one of the first memory management sub-unit 2141 and the first cache sub-unit 2142 is failed.

Failed caching of the processed data by the first computation unit 212 may be caused by failure of one or two of the first memory management sub-unit 2141 and the first cache sub-unit 2142.

The above describes the situation that the first computation unit 212 suspends the currently executed task because other resources except the first computation unit 212 may not well transmit or store the processed data, but suspending of the currently executed task by the first computation unit 212 is not totally caused by reasons other than its own.

According to an embodiment of the present disclosure, suspending the first task in response to the case where the first specific event happens includes: suspending the first task in response to a case where the first task includes a suspension instruction.

According to the above embodiments, in some circumstances, the task (such as a task kernel) executed by the first computation unit 212 may have an instruction to instruct the first computation unit 212 to suspend the task, so that when the task executes the instruction, the first computation unit 212 may stop working according to the instruction and suspend the task. In the prior art, as mentioned above, a new task may be executed after all kernels are finished. However, in embodiments of the present disclosure, when the first scheduling unit 211 monitors that the first computation unit 212 stops computation or suspends the task, the first scheduling unit 211 schedules a new task for the first computation unit 212 to fully utilize the computation capability of the first computation unit 212.

In order to continue the suspended task, according to an embodiment of the present disclosure, a task execution list may be created at the first computation unit and the first scheduling unit. The task execution list at least includes the position where the first task is suspended.

Each time one task is suspended, the task may generate a breakpoint. Each time one task is suspended, the position where the task is suspended may be stored in the first computation unit 212 and/or the first scheduling unit 211. For example, an index may be used to instruct information required when the suspended task is about to be performed, where the information includes, but is not limited to the task ID, the address of the to-be-executed task, and the data required for continuing the execution of the task. If many tasks are suspended, a list may be formed, and items in the list may store the above information required when each suspended task is about to be executed. Each time one suspended task is resumed, the suspended task may be continued according to the position where the task is suspended. Resuming the suspended task may include reading the required data for continued execution of the task from the address of the to-be-executed task according to the id of the suspended task.

The first task may be resumed according to the position where the task is suspended and the end of the first specific event. As mentioned above, the first specific event may include many situations. For example, the task may be suspended by the first computation unit 212 if sending of the processed data by the sending unit 213 is blocked, but if the congestion of sending data is eliminated, the suspended task may be resumed; in another circumstance, the failed storage of the processed data by the first storage unit may lead to the suspension of the first task, and then in this circumstance, if the storage of the processed data is resumed, the suspended task may be resumed; and in another circumstance, a stop suspension instruction in the first task instructs that the suspension period is expired, and then according to the instructing of the first task, the first task may be resumed.

When a plurality of tasks are suspended, the suspended tasks may be resumed according to various orders or methods. For example, one of the plurality of tasks may be resumed randomly; or one task with a highest priority may be resumed first according to priorities of the plurality of tasks.

Or a task that is priority to be resumed may be determined according to waiting time of the suspended tasks. In some embodiments, to avoid long time suspension of some tasks, a task with longest suspension time may be resumed first; or a timer may be set for each suspended task, and once the timer expires, the current task may be suspended, and the task with the expired timer is resumed.

The above describes the method of executing the inter-chip communication of the present disclosure by taking the circuit at the sending role as an example. The following describes a method of task scheduling in a circuit as a receiving role in combination with FIG. 4 and FIG. 5.

Figure 10A:
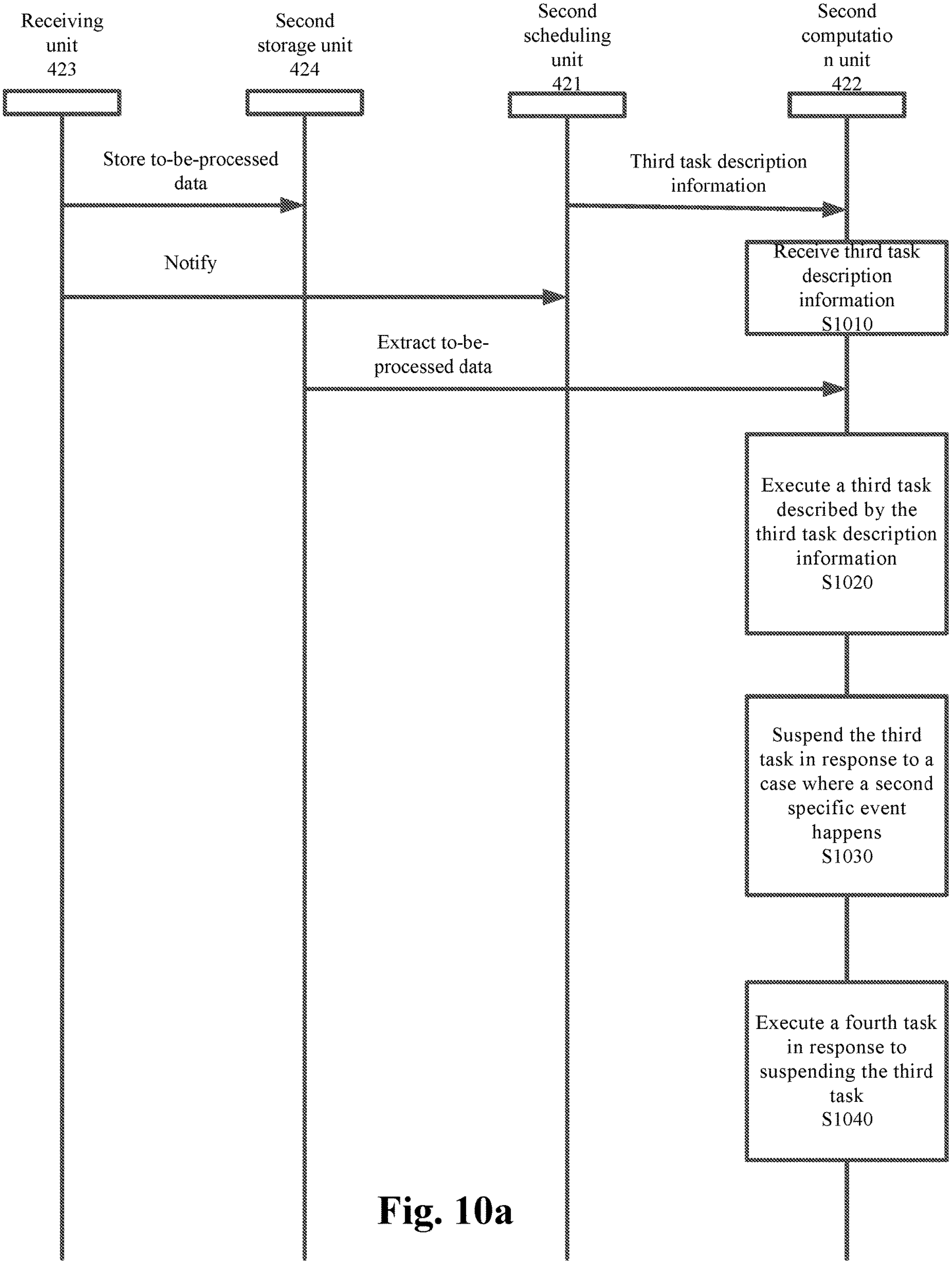
FIG. 10*a* and FIG. 10*b* show a method for inter-chip communication in an inter-chip communication circuit according to an embodiment of the present disclosure.

FIG. 10*a* shows a method for inter-chip communication in an inter-chip communication circuit according to an embodiment of the present disclosure.

In combination with FIG. 4 and FIG. 5, as shown in FIG. 10*a*, the inter-chip communication circuit may include the second scheduling unit 421, the second computation unit 422, and the second storage unit 424. The method includes: in an operation S1010, receiving, by the second computation unit 422, third task description information from the second scheduling unit 421.

The operation S1010 is the same to the operation S910 in FIG. 9, where the second scheduling unit 421 sends one task descriptor to the second computation unit 422 to make the second computation unit 422 execute a corresponding task according to the received descriptor.

The method includes: in an operation S1020, extracting, by the second computation unit 422, to-be-processed data from the second storage unit 424, and executing a third task on the to-be-processed data according to the third task description information.

As an inter-chip communication circuit of a receiver, data required by executing the third task by the second computation unit 422 may be extracted from the second storage unit 424. Data in the second storage unit 424 may be received from the receiving unit 423.

Taking FIG. 5 as an example, even though numerals are different in the text, the second computation unit 522 in FIG. 5 may extract required data from a second storage unit 523, and data in the second storage unit 523 may be received from the sending unit 513 of another chip by the receiving unit 523.

Then, according to an embodiment of the present disclosure, the inter-chip communication circuit further includes the receiving unit 423, and at the receiving unit, the to-be-processed data is received off-chip and is sent to the second storage unit for storage. After receiving the data, the receiving unit 423 may notify the second scheduling unit 421, so that the second scheduling unit 421 may send the third task description information that may process the received data to the second computation unit 422.

Next, the method includes: in an operation S1030, at the second computation unit 422, suspending the third task in response to a case where a second specific event happens.

The second specific event may include a plurality of circumstances. For example, when the receiving unit 423 does not have acceptable data used for the third task, the second computation unit 422 may suspend the third task to avoid the second computation unit 422 entering into an idle condition, which may cause wasting of computing power.

The method includes: in an operation S1040, at the second computation unit, executing a fourth task in response to suspending the third task.

As mentioned above, in the prior art, if one task is suspended, the second computation unit 422 may stop processing and wait for resuming of the task. For example, the second computation unit 422 may only release a usage right of the second computation unit 422 on the task kernel after executing of the task kernel, and the second computation unit 422 is always in a waiting condition until the execution of the task kernel is finished. Apparently, this may lead to computation resources wasting of the second computation unit 422.

In technical solutions of the present disclosure, after suspending one above task, the second computation unit 422 may start executing a new task instead of stopping working.

The new task may be stored in the second computation unit 422 in advance, so that after suspending the above task, the second computation unit 422 may obtain a new task locally and execute the new task. The new task may be scheduled by the second scheduling unit 421.

It needs to be understood that there is no necessary dependency between scheduling a new task from the second computation unit 422 by the second scheduling unit 421 and whether the second computation unit 422 suspends the above task. For example, before the second computation unit 422 suspends the above task, the second scheduling unit 421 may send a new piece of task description information to the second computation unit 422. Once the second computation unit 422 suspends the above task, the new scheduled task may be executed immediately.

In another embodiment, in a period of time before the second computation unit 422 suspends the task, the second computation unit 422 may notify the second scheduling unit 421 that the task may be suspended in a specific period of time; therefore, after receiving the notification, the second scheduling unit 421 may send a new piece of task description information to the second computation unit 422 in this period of time. Once the second computation unit 422 suspends the above task, the new scheduled task may be executed immediately.

Figure 10B:
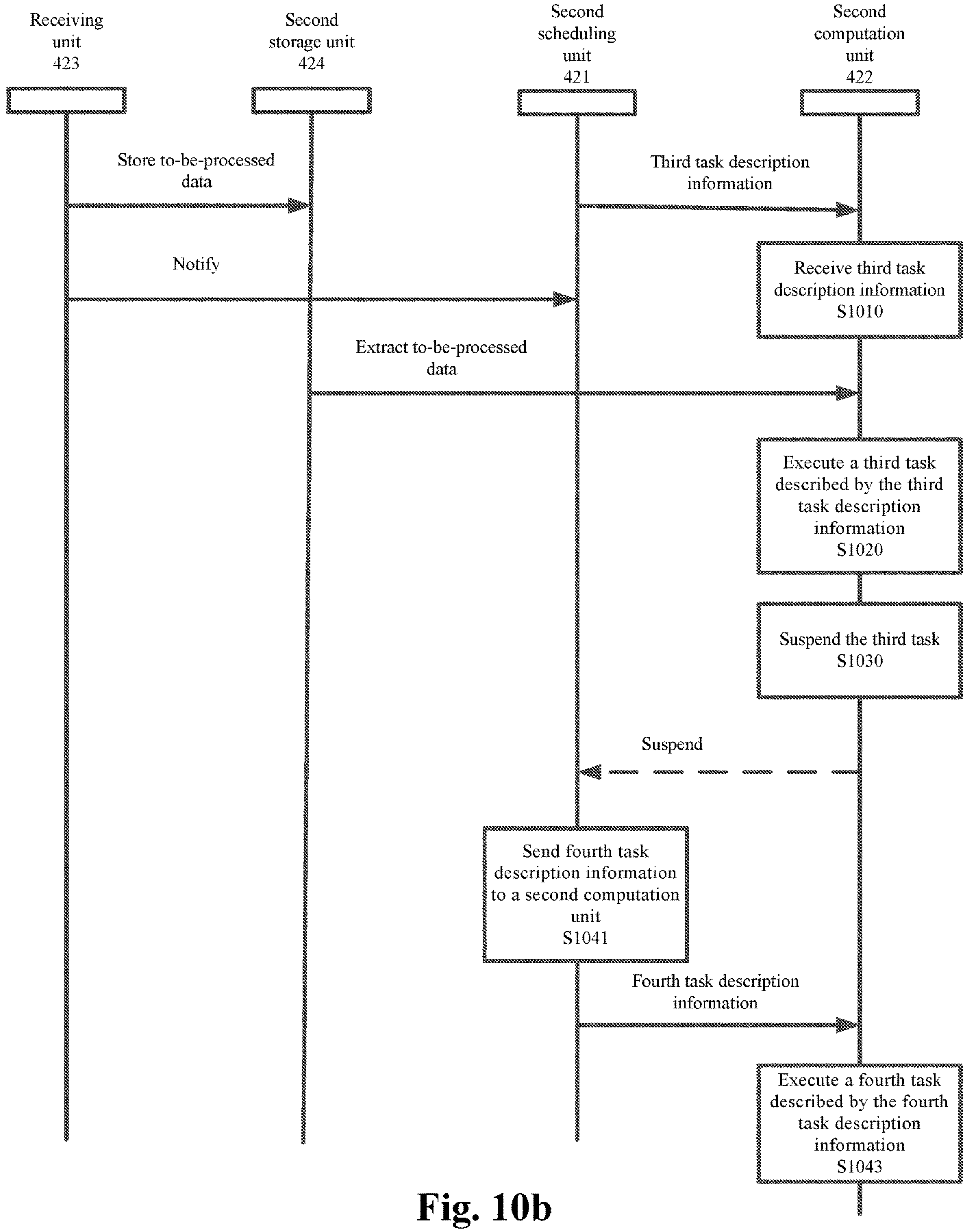

In another embodiment, as shown in FIG. 10*b*, an operation S1040 may include: in an operation S1041, at the second scheduling unit, sending fourth task description information to the second computation unit; and in an operation S1043, at the second computation unit, executing the fourth task described in the fourth task description information in response to receiving the fourth task description information.

In this embodiment, the second scheduling unit 421 may monitor whether the second computation unit 422 suspends one task, and once the second scheduling unit 421 monitors that the second computation unit 422 suspends one task, to avoid computation resources wasting caused by work suspension of the second computation unit 422, the second scheduling unit 421 may schedule new task information to the second computation unit 422. Therefore, after suspending one task, the second computation unit 422 may start executing another task, thereby improving computation efficiency.

Similar to FIG. 9*b*, dotted lines in FIG. 10*b* also represent that a notification of "suspension" may exist or not. Besides, the above operation is not necessarily performed in the order instructed by the label, but the order of the above operation may be changed according to actual situations. For example, if the second scheduling unit 421 is required to send the fourth task description information to the second computation unit 422 after responding to suspending the third task by the second computation unit 422, the operation S1041 is performed after the operation S1030. However, if sending the fourth task description information by the second scheduling unit 421 to the second computation unit 422 does not depend on whether the third task is suspended by the second computation unit 422, the operation S1041 may be performed before, after or at the same time with the operation S1030.

The third task may be suspended not only in response to a case where there is no acceptable data for the receiving unit 423, but also in response to a case where there are other second specific events.

For example, according to an embodiment of the present disclosure, the third task may be suspended in response to a case where the extraction of to-be-processed data from the second storage unit 424 is failed.

It may be seen from the above description that when executing one task, the second computation unit 422 usually needs to extract data required for task executing from the second storage unit 424. However, the second storage unit 424 may has faults, or a network through which the data is extracted from the second storage unit 424 is blocked, and then the data may not be extracted. Under such a circumstance, the second computation unit 422 may suspend the currently executed task, and after receiving information that the second computation unit 422 suspends the currently executed task, the second scheduling unit 421 sends a new task to the second computation unit 422, so as to avoid an idle condition of the second computation unit 422 caused by the task suspension.

The second storage unit 424 may include a second memory management sub-unit 4241, a third memory management sub-unit 4242, and a second cache sub-unit 4243; the second memory management sub-unit 4242 may manage storage of the to-be-processed data from the receiving unit 423 to the second cache sub-unit 4243; and the third memory management sub-unit 4242 may manage transmission of the to-be-processed data from the second cache sub-unit 4243 to the second computation unit.

For the second storage unit 424, failures in data storage or data extraction may be caused by many reasons. For example, the second memory management sub-unit 4241 may have faults, thereby being incapable of managing the storage of the second cache sub-unit 4243; the third memory management sub-unit 4242 may have faults, thereby incapable of managing the data extraction of the second cache sub-unit 4243; or the second cache sub-unit 4243 may have faults, thereby incapable of realizing data storage and data extraction.

According to an embodiment of the present disclosure, suspending the third task in response to the case where the second specific event happens may further include: suspending the third task in response to a case where the third task includes a suspension instruction.

Similar to the embodiment described in combination with FIG. 9*a* and FIG. 9*b*, in some circumstances, the task (such as a task kernel) executed by the second computation unit 422 may have an instruction to instruct the second computation unit 422 to suspend the task, so that when the task executes the instruction, the second computation unit 422 may stop working and suspend the task according to the instruction. In the prior art, as mentioned above, a new task may be executed after all kernels are finished. However, in embodiments of the present disclosure, when the second scheduling unit 421 monitors that the second computation unit 422 stops computation or suspends the task, the second scheduling unit 421 schedules a new task for the second computation unit 422 to fully utilize the computation capability of the second computation unit 422.

In order to resume the suspended task, according to an embodiment of the present disclosure, a task execution list may be created at the second computation unit 422 and the second scheduling unit 421. The task execution list at least includes a position where the third task is suspended.

Each time one task is suspended, a breakpoint may appear in the task. Each time one task is suspended, the position where the task is suspended may be stored in the second computation unit 422 and/or the second scheduling unit 421. For example, required information for the to-be-executed task that is suspended before may be stored, where the information includes but is not limited to a task id, an address of the to-be-executed task, required data for continued execution of the task. If many tasks are suspended, a list may be formed, and items in the list may store the above information of each to-be-executed task that are suspended before. When one suspended task is resumed, the suspended task may be continued according to the position where the task is suspended. Resuming the suspended task may include reading the required data for continued execution of the task from the address of the to-be-executed task according to the ID of the suspended task.

The third task may be resumed according to the position where the task is suspended and the end of the second specific event. As mentioned before, the second specific event may include many situations. For example, if the receiving unit 413 suspends the third task because of no acceptable data, the suspended third task may be resumed when there is acceptable data; in another situation, failed extraction of to-be-processed data from the second storage unit may lead to the suspension of the third task, and then under this circumstance, if the to-be-processed data is extracted normally, the suspended third task may be resumed; and in another circumstance, a stop suspension instruction in the third task instructs that the suspension period is expired, and then according to the instructing of the third task, the third task may be resumed.

When a plurality of tasks are suspended, the suspended tasks may be resumed according to various orders or methods. For example, one of the plurality of tasks may be resumed randomly; or a task with a highest priority may be resumed first according to priorities of the plurality of tasks;

or one task that is priority to be resumed may be determined according to waiting time of the suspended tasks. In some embodiments, to avoid long time suspension of some tasks, a task with longest suspension time may be resumed first; or a timer may be set for each suspended task, and once the timer expires, a current task may be suspended, and the task with the expired timer is resumed.

The present disclosure further provides an inter-chip communication circuit, which includes the first scheduling unit and the first computation unit. The first computation unit is configured to: receive the first task description information from the first scheduling unit, and execute the first task according to the first task description information; suspend the first task in response to a case where a first specific event happens; and execute the second task in response to suspending the first task.

According to an embodiment of the present disclosure, the first scheduling unit is configured to send the second task description information to the first computation unit in response to suspending the first task by the first computation unit; and the first computation unit is further configured to execute the second task in response to receiving the second description information.

The present disclosure further provides a circuit for inter-chip communication, which includes the second scheduling unit, the second computation unit, and the second storage unit. The second computation unit is configured to: receive the third task description information from the second scheduling unit; extract the to-be-processed data from the second storage unit, and execute the third task on the to-be-processed data according to the third task description information; suspend the third task in response to a case where a second specific event happens; and execute a fourth task in response to suspending the third task.

According to an embodiment of the present disclosure, the second scheduling unit is configured to send the fourth task description information to the second computation unit in response to suspending the third task by the second computation unit; the second computation unit is further configured to execute the fourth task in response to receiving the fourth description information.

The present disclosure further provides a chip that includes the aforementioned circuit.

The present disclosure further provides a system for inter-chip communication that includes the first chip and the second chip.

The present disclosure further provides an electronic device that includes the above-mentioned chip or the system.

Figure 11:
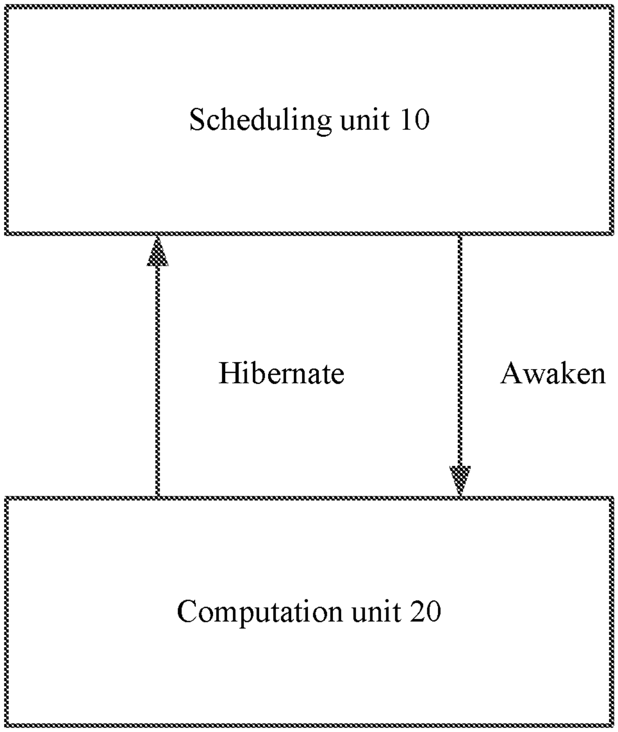
FIG. 11 shows an application scenario of hibernating (suspending)-awakening a task in progress.

FIG. 11 shows an application scenario of hibernating (suspending) or awakening a task in progress.

As shown in FIG. 11, a computation unit 20 and a scheduling unit 10 may communicate with each other, and master control roles of the two also change. It needs to be understood that the computation unit in FIG. 11 may correspond to the TC1, TC2 (as shown in FIG. 1), the first computation units 212 and 512 and the second computation units 422 and 522; and the scheduling unit 10 may correspond to the JS1, JS2 (as shown in FIG. 1), the first scheduling units 211 and 511 and the second scheduling units 421 and 521.

As shown in FIG. 11, when processing the task, the computation unit 20 is in a master control condition. When the computation units 20 needs to suspend the task because of the specific events, the computation unit 20 sends a "hibernating" notification to the scheduling unit 10 to notify the scheduling unit 10 that the computation unit 20 may suspend the task to make the task in hibernating. At this time, the computation unit 20 stores a breakpoint of the task when suspended, and synchronizes breakpoint information to the scheduling unit 10.

At this time, the scheduling unit 10 enters into a master control condition. In this condition, the scheduling unit 10 may schedule a new task to the computation unit 20 to make the computation unit 20 start to execute the new task after suspending the above task, so that the computation unit 20 enters into the master control condition again. After the suspension of the suspended task is finished, the scheduling unit 10 may awaken the suspended task.

It may be seen that in the technical solutions of the present disclosure, the computation unit 20 may not always suspend the task because of the specific events, but is always in a running and a processing state, which may improve utilization of the computation unit 20 and further improve the computation capability of the whole system.

Technical solutions of the present disclosure may be applied to an artificial intelligence field and implemented into or realized in the artificial intelligence chip. The chip may exist independently or be contained in a computation apparatus.

Besides, in a conventional chip, data may be transmitted among a plurality of components in the chip. Generally, the receiving component may only release resources of the sending component only when the receiving component receives the data. However, when a data transmission quantity is relatively large, sometimes transmission delay is large. Under such a circumstance, after sending the processed data, the sending component may not receive returned feedback timely, so that the sending component may always in a waiting condition but not process a next task. This may influence throughput of the chip, thereby decreasing processing capability of the chip.

Figure 12:
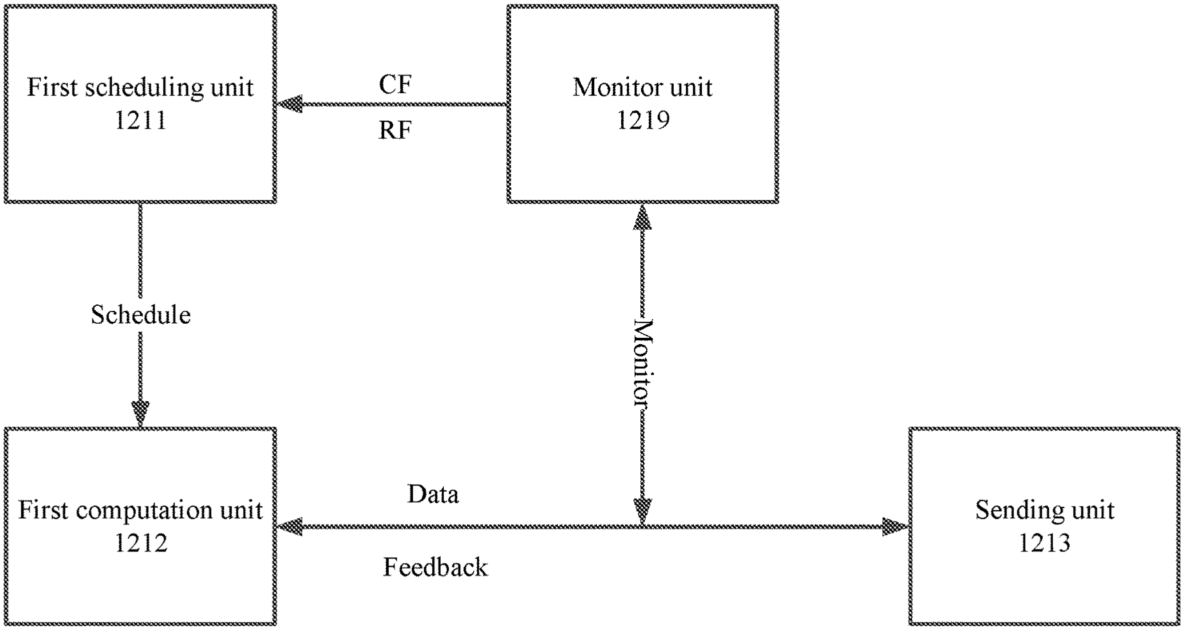
FIG. 12 is a schematic diagram of a system for data transmission according to an embodiment of the present disclosure.

FIG. 12 is a schematic diagram of a system for data transmission according to an embodiment of the present disclosure. As shown in FIG. 12, the system includes a first scheduling unit 1211, a first computation unit 1212, a sending unit 1213, and a monitor unit 1219.

In this system, the first computation unit 1212 is configured to send data to the sending unit 1213. In this present disclosure, the monitor unit 1219 may monitor a whole data transmission process from the first computation unit 1212 to the sending unit 1213 and send a corresponding instructing signal to the first scheduling unit 1211 according to the data transmission.

In an embodiment of the present disclosure, when the monitor unit 1219 monitors that the first computation unit 1212 sends the data to the sending unit 1213, the monitor unit 1219 may send an early response signal to the first computation unit, and after receiving the early response signal, the first computation unit 1212 conceives that the current task is finished and starts to process a new task. At this time, the first computation unit 1212 may send a finish signal indicating that the current task is finished to the monitor unit. The monitor unit 1219 may send a corresponding instructing signal to the first scheduling unit 1211 according to the finish signal, such as a first instructing signal. The first scheduling unit 1211 may release computation resources of the first computation unit according to the first instructing signal to make the first computation unit be capable of processing a new task. However, at this time, the first scheduling unit does not know whether the sending unit correctly receives the data sent by the first computation unit, so that the first scheduling unit still needs to keep task resources of the current task.

In an embodiment of the present disclosure, the sending unit 1213 may send a feedback signal to the first computation unit when receiving the data sent by the first computation unit. The first computation unit may send a finish signal indicating that the current task is finished to the monitor unit according to the feedback signal. The monitor unit 1219 may send a corresponding instructing signal to the first scheduling unit 1211 according to the finish signal, such as a second instructing signal. The first scheduling unit 1211 may release the task resources of the current task according to the second instructing signal.

Figure 13:
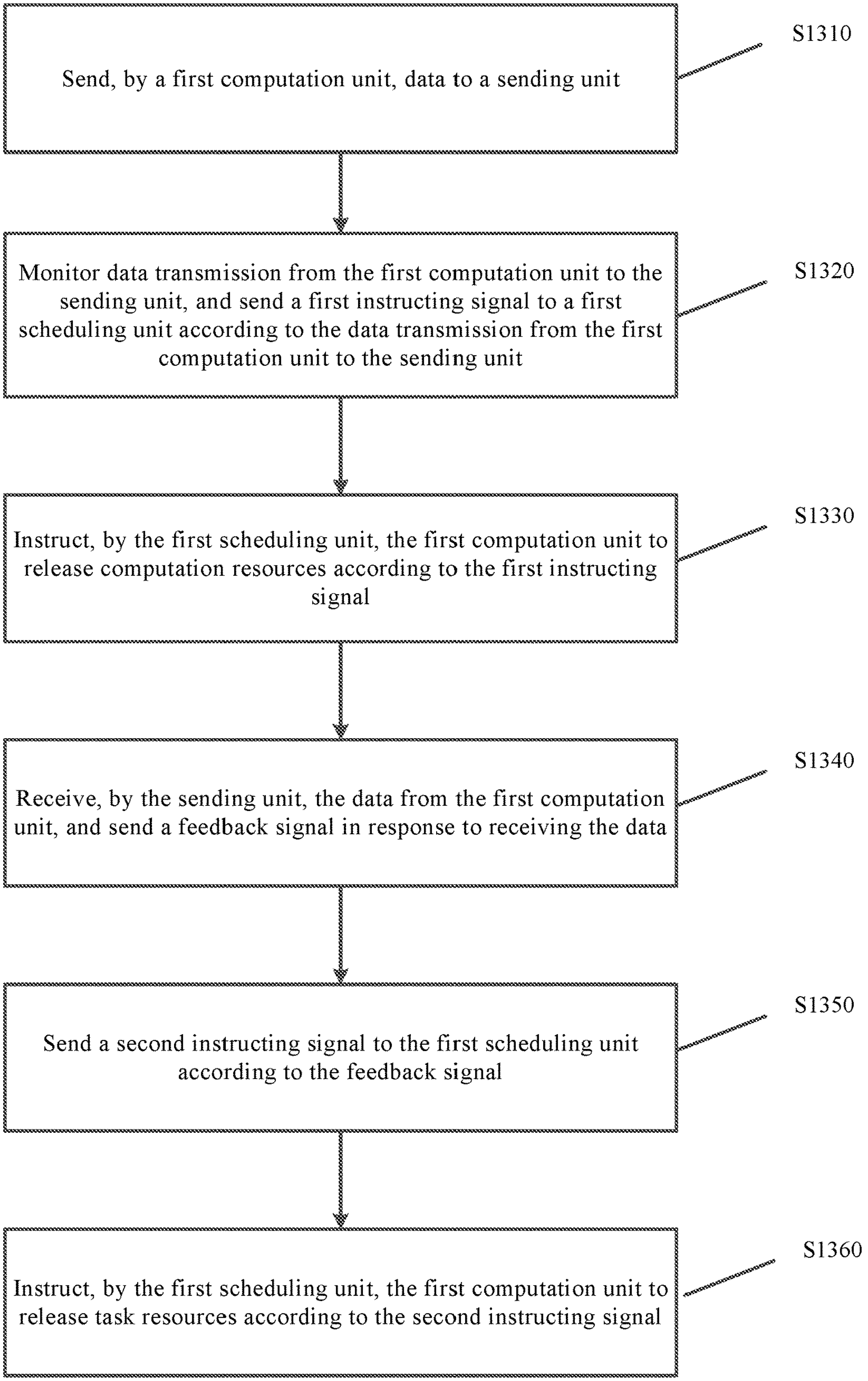
FIG. 13 is a flowchart of a method for data transmission according to an embodiment of the present disclosure.

FIG. 13 shows a flowchart of a method for data transmission according to an embodiment of the present disclosure. As shown in FIG. 13, the method of the present disclosure includes: in an operation S1310, sending, by the first computation unit 1212, data to the sending unit 1213.

The data here may be data after processed and computed by the first computation unit 1212, which may be called processed data sometimes. The data here may also be data directly obtained by the first computation unit from the host or from an external memory. Traditionally, after receiving the data from the first computation unit 1212, the sending unit 1213 may usually send a feedback signal to the first computation unit 1212 to show that the sending unit 1213 receives the data. The first computation unit 1212 may always in a waiting condition until it receives the feedback signal indicating that the current task is finished, and then the current task may release occupation of the first computation unit, so that the first computation unit may start processing a new task. Transmission delay between the first computation unit 1212 and the sending unit 1213 may lead to an idle condition of the first computation unit in a period of time, leading to wasting of computation resources of the chip, thereby decreasing processing efficiency of the chip.

In the scheme of the present disclosure, the monitor unit 1219 may be configured to monitor data transmission from the first computation unit 1212 to the sending unit 1213, and send the first instructing signal to the first scheduling unit 1211 according to the data transmission from the first computation unit 1212 to the sending unit 1213 to timely release the occupation of the first computation unit by the current task. As shown in FIG. 13, the method of the present disclosure is included in an operation S1320, where the monitor unit monitors data transmission from the first computation unit to the sending unit and sends the first instructing signal to the first scheduling unit according to the data transmission from the first computation unit to the sending unit.

According to an embodiment of the present disclosure, the first scheduling unit 1211 may be configured to instruct the first computation unit 1212 to release the computation resources according to the first instructing signal. As shown in FIG. 13, the method of the present disclosure includes: in an operation S1330, releasing, by the first scheduling unit 1211, the computation resources of the first computation unit 1212 according to the first instructing signal.

After releasing computation resources of the first computation unit 1212, the first scheduling unit 1211 may receive the task description information (such as the task descriptor) from the host, and send the task description information to the first computation unit 1212, so that the first computation unit 1212 may execute the task described in the task description information. The task description information includes a task ID, a task category, a data size, a data address, a parameter size, configuration information of the processing core (such as the first computation unit), address information of the processing core, splitting information of the task, and the like.

In some embodiments, the monitor unit 1219 may send the first instructing signal to the first scheduling unit 1211 after the monitor unit 1219 monitors the end (such as an end signal of the transmitted data) of the data transmission. The end of the data transmission may be a conditional end, and an end signal of the data transmission may be generated by the monitor unit according to received information that the data transmission of the first computation unit is finished. Correspondingly, the first instructing signal may be a conditional finish (CF) signal. This CF represents that the monitor unit 1219 monitors that a unidirectional data transmission from the first computation unit 1212 to the sending unit 1213 is finished without considering whether the sending unit actually receives the data, or whether the sending unit 1212 correctly receives the data.

According to an embodiment of the present disclosure, the first computation unit 1212 may be further configured to send a first finish signal after the data transmission is finished; the monitor unit 1219 is further configured to send the first instructing signal to the first scheduling unit 1211 in response to monitoring the first finish signal indicating that the data transmission is finished; and the first scheduling unit 1211 is further configured to instruct the first computation unit 1212 to release the computation resources according to the first instructing signal.

In this embodiment, to make it convenient for the monitor unit 1219 to make sure if the current task of the first computation unit 1212 is finished, the first computation unit 1212 may send a finish signal after finishing the current task. The finish signal represents that the first computation unit 1212 sends the data, and receives a corresponding feedback signal (such as the early response signal sent by the monitor unit). After monitoring the finish signal sent by the first computation unit, the monitor unit 1219 conceives that the first computation unit finishes the current task. Next, the monitor unit 1219 sends one CF signal to the first scheduling unit 1211. After receiving the CF signal, the first scheduling unit 1211 may instruct the first computation unit 1212 to release the computation resources. The released computation resources may be used by the first computation unit to process other data.

It needs to be understood that in the context, the first scheduling unit 1211 may send the task description information to the first computation unit 1212, so as to schedule all types of tasks for the first computation unit 1212. These tasks may be stored in the first computation unit 1212 in the form of Task ID. Each time one task is executed, the computation resources (such as computation capability of IPU) of the first computation unit 1212 may be scheduled according to the Task ID of the task to finally finish one task. In the context, after receiving the CF signal, the first scheduling unit 1211 may only instruct the first computation unit 1212 to release the computation resources to process data of other tasks, but the task resources may not be released at this time. Specifically, the Task ID in the first computation unit 1211 may not be modified, covered, or deleted. Such a feature of the Task ID ensures that the task resources may still be recalled and re-executed.

In the prior art, after sending the data, the first computation unit 1212 needs to wait for the feedback signal of the sending unit 1213. If the feedback signal of the sending unit 1213 delays because of network congestion, computation resources in the first computation unit 1212 is occupied all the time and may not operate other data, which obviously does not take full advantage of the efficiency of the first computation unit.

Next, the sending unit 1213 is configured to receive the data transmitted from the first computation unit 1212, and send the feedback signal in response to receiving the data. As shown in FIG. 13, the method of the present disclosure includes: in an operation S1340, receiving, by the sending unit 1213, the data from the first computation unit 1212, and sending the feedback signal in response to receiving the data.

In this embodiment, after receiving the data, the sending unit 1213 may send a feedback signal to show that the data is successfully received. The feedback signal sent by the sending unit 1213 represents that the data transmission from the first computation unit to the sending unit 1213 is finished. The first computation unit 1212 may determine that the current task is finished according to the feedback signal.

The monitor unit is further configured to send a second instructing signal to the first scheduling unit according to the feedback signal; and in FIG. 13, the method of the present disclosure includes: in an operation S1350, sending the second instructing signal to the first scheduling unit 1211 according to the feedback signal.

It needs to be understood that sending the second instructing signal to the first scheduling unit 1211 according to the feedback signal may include many conditions.

In one condition, the monitor unit 1219 directly monitors the feedback signal sent from the sending unit 1213 to the first computation unit 1212; and the monitor unit sends the second instructing signal to the first scheduling unit 1211 according to the monitored feedback signal sent from the sending unit 1213.

When monitoring the feedback signal, the monitor unit 1219 may send the second instructing signal to the first scheduling unit 1211, where the second instructing signal is called a real finish (RF) signal. When the monitor unit 1219 monitors the feedback signal RF sent by the sending unit 1213, a sending-feedback process from the first computation unit 1212 to the sending unit 1213 is finished. In other words, all corresponding tasks of the data are finished. Therefore, the monitor unit 1219 may send the RF signal to the first scheduling unit 1211 to notify the first scheduling unit 1211 that all tasks in the first computation unit 1212 are finished to make the first computation unit release the task resources.

In another situation, the monitor unit 1219 does not directly monitor the feedback signal from the sending unit 1213, but may works as a following method: first, the first computation unit 1212 is further configured to: send a second finish signal to the monitor unit 1219 in response to receiving the feedback signal; and then, the monitor unit 1219 monitors the second finish signal sent from the first computation unit 1212, and if the second finish signal (such as a finish signal) sent from the first computation unit 1212 is monitored, the first computation unit 1212 receives the feedback signal from the sending unit 1213. This further represents that the sending unit 1213 successfully receives the data sent by the first computation unit 1212; in other words, the sending-feedback process between the first computation unit 1212 and the sending unit 1212 is finished. Therefore, the monitor unit 1219 notifies the first scheduling unit 1211 that the tasks in the first computation unit 1212 are finished to make the first computation unit 1212 release the task resources.

Finally, the first scheduling unit 1211 is further configured to instruct the first computation unit 1212 to release the task resources according to the second instructing signal. As shown in FIG. 13, the method of the present disclosure further includes: in an operation S1360, instructing, by the first scheduling unit 1211, the first computation unit 1212 to release the task resources according to the second instructing signal.

After the task resources are released, the Task ID of the task resources may be deleted, covered, updated, and the like, to make new task resources be used by the first computation unit 1212. For example, if the first computation unit 1212 is able to process a queue including 8 tasks, in a circumstance where all task resources are not released, the first scheduling unit 1211 may not send a new task to the first computation unit 1212; if task resources of one of the eight tasks are released, the first scheduling unit 1211 may send a new task to substitute the released task resources, so that the first computation unit may receive and execute the new task.

Further, according to another embodiment of the present disclosure, a third instructing signal may be sent to the first scheduling unit in response to not receiving the feedback signal within scheduled time, or in response to receiving an incorrect feedback signal, to instruct the first computation unit 1212 to: resend the data; and/or retrieve the released computation resources to recompute the data.

The above describes the situation that the sending unit 1213 may accurately send the feedback signal. However, in some circumstances, the sending unit 1213 may not receive the data within scheduled time because of some problems such as the network congestion; Or if the feedback signal sent by the sending unit 1213 may not be timely monitored by the monitor unit 1219 due to an over-congested network, the monitor unit 1219 may send another instructing signal to the first scheduling unit 1211 to instruct the first computation unit 1212 to resend the data. In such a circumstance, the data obtained by computation of the first computation unit 1212 is required to be resent from the first computation unit 1212 to the sending unit 1213.

In another embodiment, if the sending unit 1213 sends a negative feedback signal, or the sending unit 1213 sends the negative feedback signal because the sending unit 1213 receives wrong data, the monitor unit 1219 may send another instructing signal as well to instruct the first computation unit 1212 to resend the data. In other words, the first computation unit 1212 may resend the data to the sending unit 1213. Only the computation resources instead of the task resources are released, so that the first computation unit 1212 may continue the task according to the unreleased task resources and resend data involved in the task to the sending unit 1213.

Figure 14:
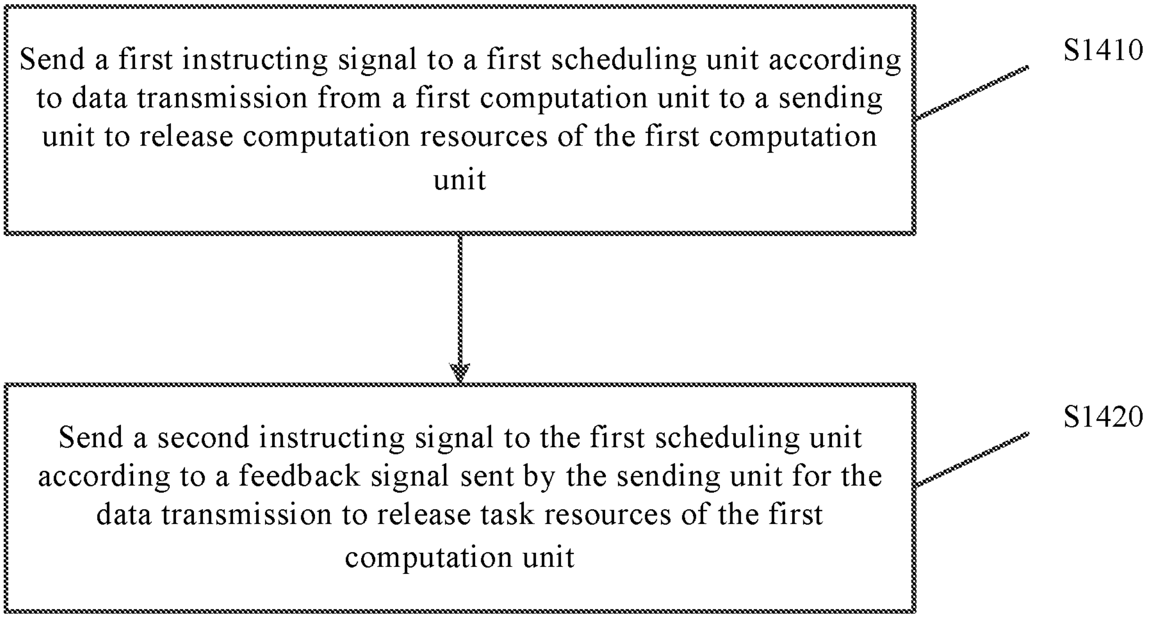
FIG. 14 is a flowchart of a method for data transmission according to an embodiment of the present disclosure.
Figure 15:
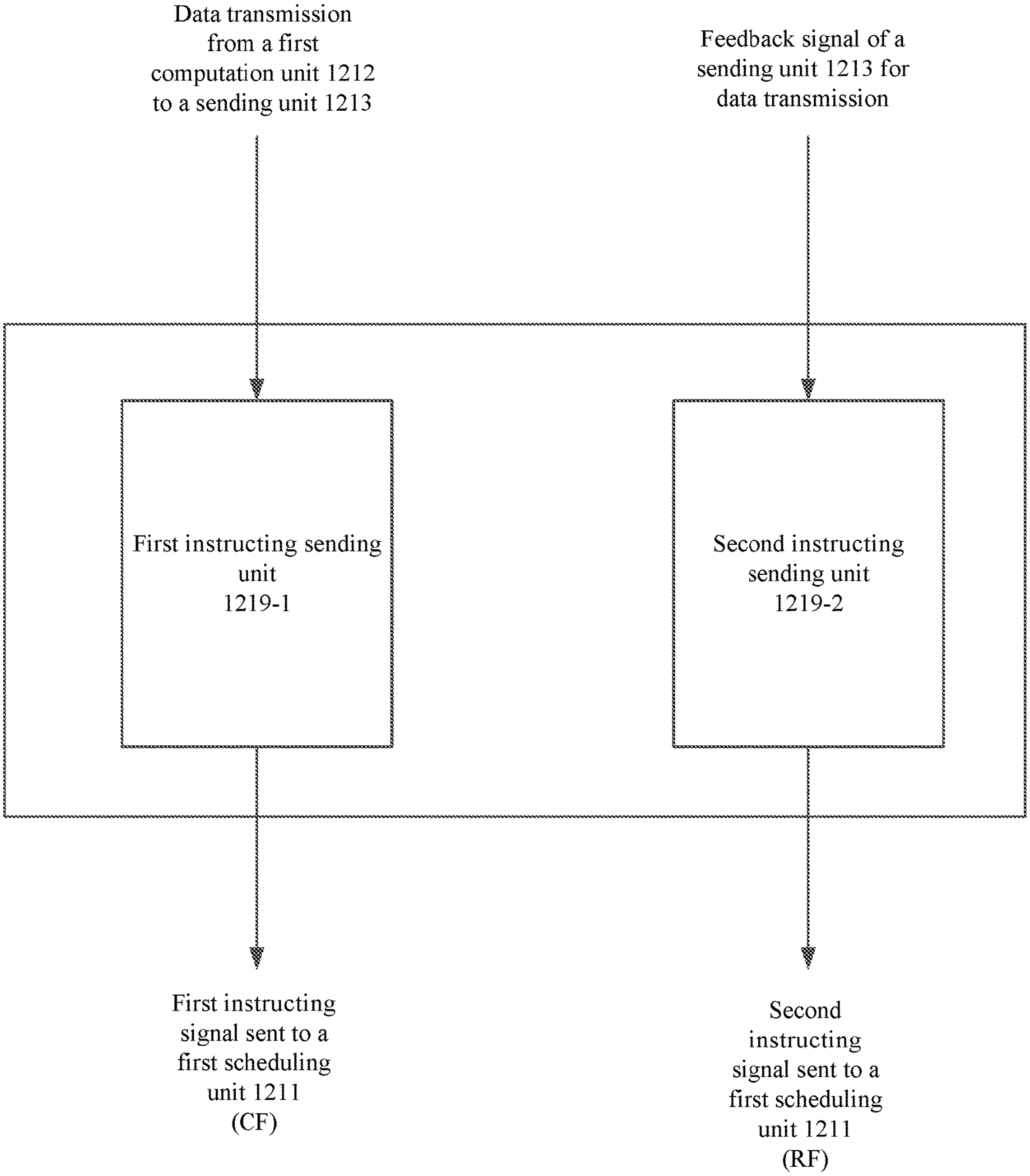
FIG. 15 is a schematic diagram of a circuit for data transmission according to an embodiment of the present disclosure.

FIG. 14 is a flowchart of a method for data transmission according to an embodiment of the present disclosure. FIG. 15 is a schematic diagram of a circuit for data transmission according to an embodiment of the present disclosure. Steps and operations shown in FIG. 14 may be executed in the monitor unit 1219 or the circuit shown in FIG. 15.

As shown in FIG. 14, the method configured to data transmission may include: in an operation S1410, sending the first instructing signal to the first scheduling unit 1211 according to the data transmission from the first computation unit 1212 to the sending unit 1213 to release the computation resources of the first computation unit 1212; and in an operation S1420, sending the second instructing signal to the first scheduling unit 1211 according to the feedback signal sent by the sending unit 1213 for the data transmission to release the computation resources of the first computation unit 1212.

As shown in FIG. 15, the monitor unit provided by the present disclosure may include: a first instructing sending unit 1219-1, which is configured to send the first instructing signal to the first scheduling unit 1211 according to the data transmission from the first computation unit 1212 to the sending unit to release the computation resources of the first computation unit 1212; and a second instructing sending unit 1219-2, which is configured to send the second instructing signal to the first scheduling unit 1211 according to the feedback signal sent by the sending unit 1213 for the data transmission to release the task resources of the first computation unit 1212.

Optionally, the monitor unit of the present disclosure may include a judgment unit to judge if the monitored finish signal sent by the first computation unit is the first finish signal or the second finish signal, where the first finish signal may be generated based on the early response signal, and the second finish signal may be generated based on the feedback signal sent by the sending unit. Further, if the finish signal is the first finish signal, the finish signal is sent to the first instructing sending unit 1219-1. If the finish signal is the second finish signal, the finish signal is sent to the second instructing sending unit 1219-2.

It needs to be understood that even though the first instructing sending unit 1219-1 and the second instructing sending unit 1219-2 are represented as two different units or modules in FIG. 15, they may be realized as one unit, but may play different roles in different time or conditions.

According to an embodiment of the present disclosure, according to the data transmission from the first computation unit 1212 to the sending unit 1213, sending the first instructing signal to the first scheduling unit 1211 to release computation resources of the first computation unit 1212 includes: sending the first instructing signal to the first scheduling unit 1211 in response to monitoring the first finish signal indicating that the data transmission is finished; and instructing, by the first scheduling unit 1211, the first computation unit 1212 to release the computation resources according to the first instructing signal.

According to an embodiment of the present disclosure, according to the feedback signal sent by the sending unit 1213 for the data transmission, sending the second instructing signal to the first scheduling unit 1211 to release the task resources of the first computation unit 1212 includes: sending, by the sending unit 1213, the feedback signal to the first computation unit 1212 in response to receiving the data; sending, by the sending unit 1213, the second instructing signal to the first scheduling unit 1211 according to the monitored feedback signal; and instructing, by the first scheduling unit 1211, the first computation unit 1212 to release the task resources according to the second instructing signal.

According to an embodiment of the present disclosure, sending the second instructing signal to the first scheduling unit 1211 according to the monitored feedback signal includes: monitoring the feedback signal sent from the sending unit 1213 to the first computation unit 1212; and sending the second instructing signal to the first scheduling unit 1211 according to the monitored feedback signal sent from the sending unit 1213.

According to an embodiment of the present disclosure, sending the second instructing signal to the first scheduling unit 1211 according to the monitored feedback signal includes: sending the feedback signal to the first computation unit 1212 through the sending unit; sending, by the first computation unit 1212, the second finish signal according to the feedback signal; and sending the second instructing signal to the first scheduling unit 1211 according to the monitored second finish signal sent from the first computation unit 1212.

According to an embodiment of the present disclosure, the first computation unit 1212 releases the computation resources, so that the first computation unit 1212 is able to process other data.

According to an embodiment of the present disclosure, the first computation unit 1212 releases the task resources, so that the released task resources are able to be deleted or substituted.

According an embodiment of the present disclosure, the third instructing signal is sent to the first scheduling unit 1211 in response to not receiving the feedback signal within scheduled time, or in response to receiving an incorrect feedback signal, to instruct the first computation unit 1212 to: resend the data; and/or retrieve the released computation resources to recompute the data.

The present disclosure further provides a chip that includes the circuit shown in FIG. 15 or the system shown in FIG. 12.

The present disclosure provides an electronic device that includes the chip described above.

The present disclosure also provides an electronic device, including: one or a plurality of processors; and a memory, where the memory stores a computer-executable instruction, and when the computer-executable instruction is run by the one or the plurality of processors, the electronic device may execute the method in FIG. 13 or FIG. 14.

The present disclosure also provides a computer-readable storage medium, on which a computer-executable instruction is stored. The method in FIG. 13 or FIG. 14 may be implemented when the computer-executable instruction is run by the one or the plurality of processors.

According to the technical solutions of the present disclosure, the first computation unit 1212 may release the computation resources, so that the computation resources may be used in processing of other data without waiting for a real feedback signal, which reduces a defect that in the traditional schemes, the computation resources may be released until the feedback signal is received, thereby improving utilization of the processing unit and improving the whole performance of the system.

Figure 7:
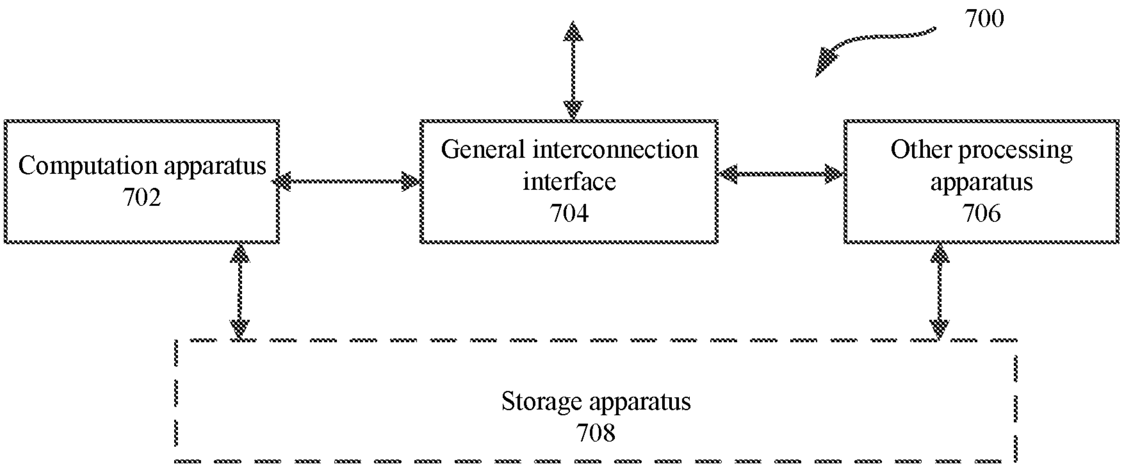
FIG. 7 shows a combined processing apparatus.

FIG. 7 shows a combined processing apparatus 700, which includes a computation apparatus 702, a general interconnection interface 704, and other processing apparatus 706. According to the present disclosure, the computation apparatus interacts with other processing apparatus to jointly complete an operation specified by the user. FIG. 7 is a schematic diagram of the combined processing apparatus.

Other processing apparatus includes one or more types of general/dedicated processors such as a central processing unit (CPU), a graphics processing unit (GPU), a neural network processor, and the like. A count of processors included in other processing apparatus is not limited. Other processing apparatus may serve as an interface that connects a machine learning computation apparatus to external data and control including data moving, and may execute basic controls such as starting and stopping the machine learning computation apparatus; and other processing apparatus may also cooperate with the machine learning computation apparatus to complete computation tasks.

The general interconnection interface is configured to transfer data and a control instruction between the computation apparatus (such as a machine learning computation apparatus) and other processing apparatus. The computation apparatus obtains input data required from other processing apparatus and write the data in an on-chip storage apparatus of the computation apparatus. The computation apparatus may also obtain the control instruction from other processing apparatus and write the control instruction in an on-chip control caching unit of the computation apparatus. Additionally, the computation apparatus may further read data stored in a storage unit of the computation apparatus and transmit the data to other processing apparatus.

Optionally, the structure may further include a storage apparatus 708. The storage apparatus may be connected to the computation apparatus and other processing apparatus respectively. The storage apparatus may be configured to store data of the computation apparatus and other processing apparatus. The storage apparatus may be especially suitable for storing data, where the data is required to be computed, but may not be completely stored in the internal storage of the computation apparatus or other processing apparatus of the present disclosure.

The combined processing apparatus may be used as a system on chip (SoC) of a device including a mobile phone, a robot, a drone, a video surveillance device, and the like, which may effectively reduce a core area of a control part, increase a processing speed, and reduce overall power consumption. In this case, the general interconnection interface of the combined processing apparatus may be connected to some components of the device. The components include, for example, a webcam, a monitor, a mouse, a keyboard, a network card, and a WIFI interface.

In some embodiments, the present disclosure also provides a chip package structure, including the above-mentioned chip.

Figure 8:
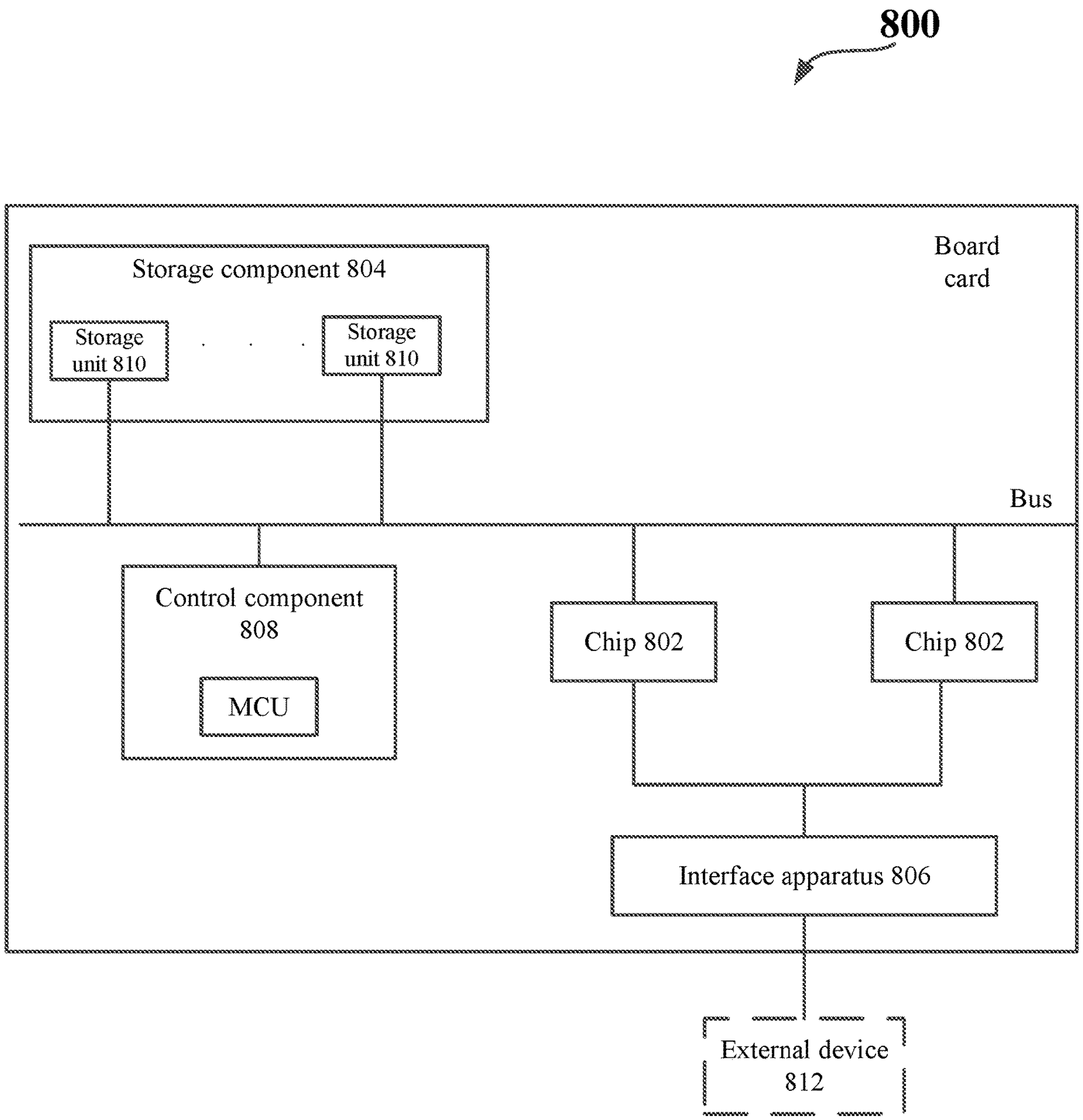
FIG. 8 provides an exemplary board card.

In some embodiments, the present disclosure also provides a board card, including the above-mentioned chip package structure. FIG. 8 provides an exemplary board card, which not only includes the above-mentioned chip 802, but also includes other supporting components. Other supporting components include but are not limited to a storage component 804, an interface apparatus 806, and a control component 808.

The storage component is connected to the chip in the chip package structure through a bus, and the storage component is configured to store data. The storage component may include a plurality of groups of storage units 810. Each group of the storage units may be connected to the chip through the bus. It may be understood that each group of the storage units may be a double data rate (DDR) synchronous dynamic random access memory (SDRAM).

A DDR may double the speed of SDRAM without increasing the clock frequency. A DDR may allow data to be read on rising and falling edges of a clock pulse. A speed of DDR is twice that of a standard SDRAM. In an embodiment, the storage apparatus may include 4 groups of storage units. Each group of the storage unit may include a plurality of DDR4 particles (chips). In an embodiment, four 72-bit DDR4 controllers may be arranged inside the chip, where 64 bits of each 72-bit DDR4 controller are for data transmission and 8 bits are for error checking and correcting (ECC) parity. In an embodiment, each group of the storage units includes a plurality of DDR SDRAMs arranged in parallel. The DDR may transmit data twice in one clock cycle. A controller for controlling the DDR may be arranged in the chip, and the controller may be used to control data transmission and data storage of each storage unit.

The interface apparatus may be electrically connected to the chip inside the chip package structure. The interface apparatus is configured to implement data transmission between the chip and an external device 812 (such as a server or a computer). For example, in an embodiment, the interface apparatus may be a standard peripheral component interconnect express (PCIe) interface. For instance, data to be processed may be transferred by a server through the standard PCIe interface to the chip to realize data transmission. In another embodiment, the interface apparatus may also be other interfaces. Specific representations of other interfaces are not limited in the present disclosure, as long as the interface unit may realize a switching function. Additionally, a computation result of the chip is still sent back to the external device (such as the server) by the interface apparatus.

The control component may be electrically connected to the chip. The control component may be configured to monitor a state of the chip. Specifically, the chip and the control component may be electrically connected through a serial peripheral interface (SPI). The control component may include a micro controller unit (MCU). If the chip includes a plurality of processing chips, a plurality of processing cores, or a plurality of processing circuits, the chip may be capable of driving a plurality of loads. Therefore, the chip may be in different working states, such as a multi-load state and a light-load state. Through the control component, regulation and control of working states of the plurality of processing chips, processing cores and/or processing circuits in the chip may be realized.

In some embodiments, the present disclosure also provides an electronic device or apparatus, including the above-mentioned board card.

The electronic device or apparatus includes a data processing apparatus, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle may include an airplane, a ship, and/or a car. The household appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

It should be noted that for the sake of conciseness, the foregoing method embodiments are all described as a series of combinations of actions, but those skilled in the art should know that the present disclosure is not limited by the described order of action since the steps may be executed in a different order or simultaneously according to the present disclosure. Secondly, those skilled in the art should also understand that the embodiments described in the specification are all optional, and the actions and modules involved are not necessarily required for this disclosure.

In the embodiments above, the description of each embodiment has its own emphasis. For a part that is not described in detail in one embodiment, reference may be made to related descriptions in other embodiments.

In the several embodiments provided in this disclosure, it should be understood that the disclosed apparatus may be implemented in other ways. For instance, the apparatus embodiments described above are merely illustrative. For instance, a division of the units is only a logical function division. In a real implementation, there may be other manners for the division. For instance, a plurality of units or components may be combined or may be integrated in another system, or some features may be ignored or not executed. Additionally, the displayed or discussed mutual coupling or direct coupling or communication connection may be implemented through indirect coupling or communication connection of some interfaces, apparatuses or units, and may be in electrical, optical, acoustic, magnetic or other forms.

The units described as separate components may or may not be physically separated. The components shown as units may or may not be physical units. In other words, the components may be located in one place, or may be distributed to a plurality of network units. According to certain needs, some or all of the units may be selected for realizing the purposes of the embodiments of the present disclosure.

In addition, each functional unit in every embodiment of the present disclosure may be integrated into one processing unit, or each unit may be physically stand alone, or two or more units may be integrated into one unit. The integrated units above may be implemented in the form of hardware or in the form of software program modules.

When the integrated units are implemented in the form of a software program module and sold or used as an independent products, the integrated units may be stored in a computer-readable memory. Based on such understanding, the technical solutions of the present disclosure may be embodied in the form of a software product that is stored in a memory. The software product includes several instructions to enable a computer device (a personal computer, a server, or a network device, and the like) to execute all or part of the steps of the method of the embodiments of the present disclosure. The foregoing memory includes: a USB flash drive, a read-only memory (ROM), a random-access memory (RAM), a mobile hard disk, a magnetic disk, or an optical disc, and other media that may store program codes.

The embodiments of the present disclosure have been described in detail above. The present disclosure explains principles and implementations of the present disclosure with specific examples. Descriptions of the embodiments above are only used to facilitate understanding of the method and core ideas of the present disclosure. Simultaneously, those skilled in the art may change the specific implementations and application scope of the present disclosure based on the ideas of the present disclosure. In summary, the content of this specification should not be construed as a limitation on the present disclosure. 2020116249325

Article A1. A circuit for inter-chip communication, including a first scheduling unit, a first computation unit, and a sending unit, where the first scheduling unit is configured to receive first task description information; the first computation unit is configured to receive the first task description information from the first scheduling unit and process first data according to the first task description information to obtain first processed data; the first computation unit is further configured to send the first processed data to the sending unit; and the sending unit is configured to send the first processed data off-chip.

Article A2. The circuit of article A1, further including a first storage unit, where the first computation unit is further configured to send the first processed data to the first storage unit to cache the first processed data.

Article A3. The circuit of article A1 or A2, where, under the control of the first computation unit, the sending unit sends the first processed data in response to receiving the first processed data.

Article A4. The circuit of article A2, where the first storage unit includes a first memory management sub-unit and a first cache sub-unit, where the first memory management sub-unit is configured to manage storage of the first processed data on the first cache sub-unit.

Article A5. The circuit of any one of articles A1 to A4, where the first scheduling unit is configured to receive the first task description information from a host.

Article A6. The circuit of any one of articles A1 to A5, where the first data derives from the host or the first storage unit.

Article A7. A method for inter-chip communication, including: receiving first task description information through a first scheduling unit; processing first data according to the first task description information through a first computation unit to obtain first processed data; sending the first processed data to a sending unit through the first computation unit; and sending the first processed data off-chip through the sending unit.

Article A8. The method of article A7, further including: sending the first processed data to a first storage unit to cache the first processed data.

Article A9. The circuit of article A8, where the first storage unit includes a first memory management sub-unit and a first cache sub-unit, where the first memory management sub-unit is configured to manage storage of the first processed data on the first cache sub-unit.

Article A10. The method of any one of articles A7 to A9, where the first task description information is received from a host through the first scheduling unit.

Article A11. The method of any one of articles A7 to A10, where the first data derives from the host or the first storage unit.

A12. A circuit for inter-chip communication, including a second scheduling unit, a second computation unit, a receiving unit, and a second storage unit, where the receiving unit is configured to receive first processed data, send the first processed data to the second storage unit, and notify the second scheduling unit that the first processed data is received;

the second scheduling unit is configured to receive second task description information, and instruct the second computation unit to process the first processed data; and the second computation unit is configured to receive the first processed data from the second storage unit, receive the second task description information from the second scheduling unit, and process the first processed data according to the second task description information to obtain second processed data.

Article A13. The circuit of A12, where the second storage unit includes a second memory management sub-unit, a third memory management sub-unit, and a second cache sub-unit; the second memory management sub-unit is configured to manage storage of the first processed data from the sending unit to the second cache sub-unit; and the third memory management sub-unit is configured to manage transmission of the first processed data from the second cache sub-unit to the second computation unit.

Article A14. The circuit of article A13 or A14, where the second scheduling unit is configured to receive the second task description information from a host.

Article A15. A chip, including the circuit of any one of articles A1 to A6, or the circuit of any one of articles A12 to A14.

Article A16. An electronic device, including the circuit of any one of articles A1 to A6 or the chip of article A15; or the circuit of any one of articles A12 to A14 or the chip of article A15.

Article A17. A system for inter-chip communication, including a first chip and a second chip, where the first chip includes a first scheduling unit, a first computation unit, and a sending unit, where the first scheduling unit is configured to receive first task description information; the first computation unit is configured to receive the first task description information from the first scheduling unit and process first data according to the first task description information to obtain first processed data; the first computation unit is further configure to send the first processed data to the sending unit; the sending unit is configured to send the first processed data to the second chip; the second chip includes a second scheduling unit, a second computation unit, a receiving unit, and a second storage unit, where the receiving unit is configured to receive the first processed data from the first chip, send the first processed data to the second storage unit, and notify the second scheduling unit that the first processed data is received; the second scheduling unit is configured to receive second task description information and instruct the second computation unit to process the first processed data; the second computation unit is configured to receive the first processed data from the second storage unit, receive the second task description information from the second scheduling unit, and process the first processed data according to the second task description information to obtain second processed data.

Article A18. The system of article A17, where the first chip further includes a first storage unit, and the first computation unit is further configured to send the first processed data to the first storage unit to cache the first processed data.

Article A19. An electronic device, including the system of article A17 or A18.

Article B1. A method for task scheduling in an inter-chip communication circuit, where the inter-chip communication circuit includes a first scheduling unit and a first computation unit, and the method includes: receiving first task description information from the first scheduling unit through the first computation unit and executing a first task according to the first task description information; at the first computation unit, suspending the first task in response to a case where a first specific event happens; and at the first computation unit, executing a second task in response to suspending the first task.

Article B2. The method of article B1, where executing the second task in response to suspending the first task includes: at the first scheduling unit, sending second task description information to the first computation unit in response to suspending the first task by the first computation unit; and at the first computation unit, executing the second task in response to receiving the second task description information.

Article B3. The method of article B1 or B2, where the inter-chip communication circuit further includes a sending unit, where, at the sending unit, processed data is received from the first computation unit and is sent off-chip, where suspending the first task in response to the case where the first specific event happens includes: suspending the first task in response to a case where the sending of processed data by the sending unit is blocked.

Article B4. The method of any one of articles B1 to B3, where the inter-chip communication circuit further includes a first storage unit, where the first storage unit is configured to receive the processed data from the first computation unit to cache the processed data, where suspending the first task in response to the case where the first specific event happens includes: suspending the first task in response to a case where the caching of the processed data by the first storage unit is failed.

Article B5. The method of article B4, where the first storage unit includes a first memory management sub-unit and a first cache sub-unit, where the first memory management sub-unit is configured to manage storage of the processed data on the first cache sub-unit; where the first task is suspended in response to a case where the caching of the processed data by at least one of the first memory management sub-unit and the first cache sub-unit is failed.

Article B6. The method of any one of articles B1 to B5, where suspending the first task in response to the case where the first specific event happens includes: suspending the first task in response to a case where the first task includes a suspension instruction.

Article B7. The method of any one of articles B1 to B6, further including: creating a task execution list at the first computation unit and the first scheduling unit, where the task execution list at least includes a position where the first task is suspended.

Article B8. The method of article B7, further including: at the first computation unit, resuming the first task according to the position where the first task is suspended in response to the end of the first specific event.

Article B9. The method of article B7, where, when a plurality of tasks are suspended, one of the plurality of tasks is resumed randomly; or a task with a highest priority is resumed according to priorities of the plurality of tasks.

Article B10. A method for task scheduling in an inter-chip communication circuit, where the inter-chip communication circuit includes a second scheduling unit, a second computation unit, and a second storage unit, and the method includes: receiving third task description information from the second scheduling unit through the second computation unit; extracting to-be-processed data from the second storage unit through the second computation unit, and executing a third task on the to-be-processed data according to the third task description information; suspending the third task at the second computation unit in response to a case where a second specific event happens; and executing a fourth task at the second computation unit in response to suspending the third task.

Article B11. The method of article B10, where, at the second computation unit, executing the fourth task in response to suspending the third task includes: at the second scheduling unit, sending fourth task description information to the second computation unit in response to suspending the third task by the second computation unit; and at the second computation unit, executing the fourth task in response to receiving the fourth task description information.

Article B12. The method of any one of article B10 or B11, where the inter-chip communication circuit further includes a receiving unit, where, at the receiving unit, the to-be-processed data is received off-chip and is sent to the second storage unit for storage, where the third task is suspended in response to the case where the second specific event happens; and the third task is suspended in response to a case where there is no acceptable data for the receiving unit.

Article B13. The method of article B12, where the second storage unit includes a second memory management sub-unit, a third memory management sub-unit, and a second cache sub-unit, where storage of the to-be-processed data from the receiving unit to the second cache sub-unit is managed through the second memory management sub-unit; and transmission of the to-be-processed data from the second cache sub-unit to the second computation unit is managed through the third memory management sub-unit.

Article B14. The method of any one of articles B10 to B13, where suspending the third task in response to the case where the second specific event happens includes: suspending the third task in response to a case where the extraction of the to-be-processed data from the second storage unit is failed.

Article B15. The method of any one of articles B10 to B14, where suspending the third task in response to the case where the second specific event happens includes: suspending the third task in response to a case where the third task includes a suspension instruction.

Article B16. The method of any one of articles B10 to B15, further including: creating a task execution list at the second computation unit and the second scheduling unit, where the task execution list at least includes a position where the third task is suspended.

Article B17. The method of article B16, further including: at the second computation unit, resuming the third task according to the position where the third task is suspended in response to the end of the second specific event.

Article B18. The method of article B17, where, when a plurality of tasks are suspended, one of the plurality of tasks is resumed randomly; or a task with a highest priority is resumed according to priorities of the plurality of tasks.

Article B19. A circuit for inter-chip communication, including a first scheduling unit and a first computation unit, where the first computation unit is configured to receive first task description information from the first scheduling unit and execute a first task according to the first task description information; the first computation unit is configured to suspend the first task in response to a case where a first specific event happens; and the first computation unit is configured to execute a second task in response to suspending the first task.

Article B20. The circuit of article B19, where the first scheduling unit is configured to send second task description information to the first computation unit in response to suspending the first task by the first computation unit; and the first computation unit is further configured to execute the second task in response to receiving the second task description information.

Article B21. A circuit for inter-chip communication, including a second scheduling unit, a second computation unit, and a second storage unit, where the second computation unit is configured to receive third task description information from the second scheduling unit;

the second computation unit is configured to extract to-be-processed data from the second storage unit and execute a third task on the to-be-processed data according to the third task description information; the second computation unit is configured to suspend the third task in response to a case where a second specific event happens; and the second computation unit is configured to execute a fourth task in response to suspending the third task.

Article B22. The circuit of article B21, where the second scheduling unit is configured to send fourth task description information to the second computation unit in response to suspending the third task by the second computation unit; and the second computation unit is further configured to execute the fourth task in response to receiving the fourth task description information.

Article B23. A chip, including the circuit of any one of articles B19 to B22.

Article B24. A system for inter-chip communication, including a first chip and a second chip, where the first chip includes the circuit of article B19 or B20, and the second chip includes the circuit of article B21 or B22.

Article B25. An electronic device, including the chip of article B23 or the system of article B24.

Article C1. A method for data transmission, including: sending a first instructing signal to a first scheduling unit according to data transmission from a first computation unit to a sending unit to release computation resources of the first computation unit; and sending a second instructing signal to the first scheduling unit according to a feedback signal sent by the sending unit for the data transmission to release task resources of the first computation unit.

Article C2. The method of article C1, where sending the first instructing signal to the first scheduling unit to release the computation resources of the first computation unit according to the data transmission from the first computation unit to the sending unit includes: sending the first instructing signal to the first scheduling unit in response to monitoring a first finish signal indicating that the data transmission is finished; and instructing, by the first scheduling unit, the first computation unit to release the computation resources according to the first instructing signal.

Article C3. The method of article C1 or C2, where sending the second instructing signal to the first scheduling unit according to the feedback signal sent by the sending unit for the data transmission to release the task resources of the first computation unit includes: sending, by the sending unit, the feedback signal to the first computation unit in response to receiving the data; sending the second instructing signal to the first scheduling unit according to the monitored feedback signal; and instructing, by the first scheduling unit, the first computation unit to release the task resources according to the second instructing signal.

Article C4. The method of article C3, where sending the second instructing signal to the first scheduling unit according to the monitored feedback signal includes: monitoring the feedback signal sent from the sending unit to the first computation unit; and sending the second instructing signal to the first scheduling unit according to the monitored feedback signal from the sending unit.

Article C5. The method of article C3, where sending the second instructing signal to the first scheduling unit according to the monitored feedback signal includes: sending the feedback signal to the first computation unit through the sending unit; sending, by the first computation unit, a second finish signal according to the feedback signal; and sending the second instructing signal to the first scheduling unit according to the monitored second finish signal sent from the first computation unit.

Article C6. The method of any one of articles C1 to C5, where the first computation unit releases the computation resources, so that the first computation unit is able to process other data.

Article C7. The method of any one of articles C1 to C6, where the first computation unit releases the task resources, so that the released task resources are able to be deleted or substituted.

Article C8. The method of any one articles C1 to C7, where a third instructing signal is sent to the first scheduling unit in response to not receiving the feedback signal within scheduled time, or in response to receiving an incorrect feedback signal, to instruct the first computation unit to: resend the data; and/or retrieve the released computation resources to recompute the data.

Article C9. The method of any one of articles C1 to C8, further including: monitoring unreturned feedback signals for the task resources at the first scheduling unit.

Article C10. A system for data transmission, including: a first scheduling unit, a first computation unit, a sending unit, and a monitor unit, where the first computation unit is configured to send data to the sending unit; the monitor unit is configured to monitor data transmission from the first computation unit to the sending unit and send a first instructing signal to the first scheduling unit according to the data transmission from the first computation unit to the sending unit; and the first scheduling unit is configured to instruct the first computation unit to release computation resources according to the first instructing signal.

Article C11. The system of article C10, where the sending unit is configured to receive the data from the first computation unit and send a feedback signal in response to receiving the data; the monitor unit is further configured to send a second instructing signal to the first scheduling unit according to the feedback signal; and the first scheduling unit is further configured to instruct the first computation unit to release task resources according to the second instructing signal.

Article C12. The system of article C10, where the first computation unit is further configured to send a first finish signal after the data transmission is finished; the monitor unit is further configured to send the first instructing signal to the first scheduling unit in response to monitoring the first finish signal indicating that the data transmission is finished; and the first scheduling unit is further configured to instruct the first computation unit to release the computation resources according to the first instructing signal.

Article C13. The system of article C11 or C12, where the monitor unit is further configured to send the second instructing signal to the first scheduling unit according to the feedback signal, comprising: monitoring the feedback signal sent from the sending unit to the first computation unit; and sending the second instructing signal to the first scheduling unit according to the monitored feedback signal sent from the sending unit.

Article C14. The system of article C11 or C12, where the sending unit is further configured to send a second finish signal in response to receiving the feedback signal, where the monitor unit is further configured to send the second instructing signal to the first scheduling unit according to the feedback signal, comprising: sending the second instructing signal to the first scheduling unit according to the monitored second finish signal sent from the first computation unit.

Article C15. The system of any one of articles C10 to C14, where the first computation unit is further configured to release the computation resources, so that the first computation unit is able to process other data.

Article C16. The system of any one of articles C11 to C15, where the first computation unit is further configured to release the task resources, so that the released task resources are able to be deleted or substituted.

Article C17. The system of any one of articles C11 to C16, where the monitor unit is further configured to: send a third instructing signal to the first scheduling unit in response to not receiving the feedback signal within scheduled time, or in response to receiving an incorrect feedback signal, to instruct the first computation unit to: resend the data; and/or retrieve the released computation resources to recompute the data.

Article C18. A method for data transmission, including: sending, by a first computation unit, data to a sending unit; monitoring data transmission from the first computation unit to the sending unit, and sending a first instructing signal to a first scheduling unit according to the data transmission from the first computation unit to the sending unit; instructing, by the first scheduling unit, the first computation unit to release computation resources according to the first instructing signal.

Article C19. The method of article C18, where the data from the first computation unit is received through the sending unit, and a feedback signal is sent in response to receiving the data; a second instructing signal is sent to the first scheduling unit according to the feedback signal; and the first computation unit is instructed to release task resources according to the second instructing signal.

Article C20. The method of article C18, where a first finish signal is sent after the data transmission is finished through the first computation unit; the first instructing signal is sent to the first scheduling unit in response to monitoring the first finish signal indicating that the data transmission is finished; and the first computation unit is instructed to release the computation resources according to the first instructing signal through the first scheduling unit.

Article C21. The method of article C19, where sending the second instructing signal to the first scheduling unit according to the feedback signal includes: monitoring the feedback signal sent from the sending unit to the first computation unit; and sending the second instructing signal to the first scheduling unit according to the monitored feedback signal sent from the sending unit.

Article C22. The method of article C19, where, through the sending unit, a second finish signal is sent in response to receiving the feedback signal, where sending the second instructing signal to the first scheduling unit according to the feedback signal includes: sending the second instructing signal to the first scheduling unit according to the monitored second finish signal sent from the first computation unit.

Article C23. The method of any one of articles C18 to C21, where the computation resources are released, so that the first computation unit is able to process other data.

Article C24. The method of any one of articles C19 to C22, where the task resources are released, so that the released task resources are able to be deleted or substituted.

Article C25. The method of any one of articles C18 to C24, further including:

sending a third instructing signal to the first scheduling unit in response to not receiving the feedback signal within scheduled time, or in response to receiving an incorrect feedback signal, to instruct the first computation unit to: resend the data; and/or retrieve the released computation resources to recompute the data.

Article C26. A chip, including the system of any one of articles C11 to C17.

Article C27. An electronic device, including the chip of article C25.

Article C28. A computer-readable storage medium, including a computer-executable instruction, where the method of any one of articles C 1 to C9 or articles C18 to C25 is executed when the computer-executable instruction is run by one or a plurality of processors.

What is claimed is:

1. A chip for inter-chip communication, comprising:
- a first scheduling circuit configured to receive a first task descriptor;
- a sending circuit; and
- a first computation circuit configured to:
  - receive the first task descriptor from the first scheduling circuit, wherein the first task descriptor includes a task identifier (ID), a task category, a data size, a data address, a parameter size, configuration information of the first computation circuit;
  - execute a first task to obtain processed data based on the first task descriptor;
  - suspend the execution of the first task based on a failure of caching of the processed data by a first storage circuit;
  - record a position at which the execution of the first task is suspended;
  - execute a second task based on the suspension of the execution of the first task, wherein the second task is scheduled by the first scheduling circuit based on the suspension of the execution of the first task;
  - resume the first task according to the position where the execution of the first task is suspended and an end of the failure of caching; and
  - send the processed data to the sending circuit, wherein the sending circuit, under control of the first computation circuit, is configured to send the processed data to another chip in response to reception of the processed data.

2. The chip for inter-chip communication of claim 1, wherein
- the first scheduling circuit is further configured to:
  - receive the first task descriptor from a host; and
  - receive data from one of the host or the first storage circuit.

3. The chip for inter-chip communication of claim 1, further comprising a monitor circuit, wherein
- the monitor circuit is configured to:
  - monitor transmission of the processed data from the first computation circuit to the sending circuit; and
  - send a first instructing signal to the first scheduling circuit according to the transmission of the processed data from the first computation circuit to the sending circuit, and
- the first scheduling circuit is further configured to instruct the first computation circuit to release computation resources according to the first instructing signal.

4. The chip for inter-chip communication of claim 3, wherein
- the sending circuit is further configured to:
  - receive the processed data from the first computation circuit; and
  - send a feedback signal in response to the reception of the processed data,
- the monitor circuit is further configured to send a second instructing signal to the first scheduling circuit according to the feedback signal, and
- the first scheduling circuit is further configured to instruct the first computation circuit to release the computation resources according to the second instructing signal.

5. The chip for inter-chip communication of claim 4, wherein
- the first computation circuit is further configured to send a first finish signal after the transmission of the processed data is finished, the monitor circuit is further configured to send the first instructing signal to the first scheduling circuit in response to monitoring the first finish signal, wherein the first finish signal indicates the transmission of the processed data is finished, and
- the first scheduling circuit is further configured to instruct the first computation circuit to release the computation resources according to the first instructing signal.

6. The chip for inter-chip communication of claim 4, wherein
- when the second instructing signal is sent to the first scheduling circuit according to the feedback signal, the monitor circuit is further configured to:
  - monitor the feedback signal sent from the sending circuit to the first computation circuit; and
  - send the second instructing signal to the first scheduling circuit based on the monitoring of the feedback signal.

7. The chip for inter-chip communication of claim 5, wherein
- the first computation circuit is further configured to send a second finish signal in response to the reception of the feedback signal; and
- when the monitor circuit is further configured to send the second instructing signal to the first scheduling circuit according to the feedback signal, the monitor circuit is further configured to send the second instructing signal to the first scheduling circuit according to monitored second finish signal sent from the first computation circuit.

8. The chip for inter-chip communication of claim 3, wherein the monitor circuit is further configured to:
- send a third instructing signal to the first scheduling circuit in response to one of non-reception of a feedback signal within scheduled time, or reception of an incorrect feedback signal; and
- according to the third instructing signal, the first scheduling circuit is further configured to instruct the first computation circuit to:
  - resend the processed data; and
  - retrieve the released computation resources to recompute the processed data.

9. The chip of claim 1, wherein
- the first scheduling circuit is configured to send a second task descriptor to the first computation circuit in response to suspending the first task by the first computation circuit; and
- the first computation circuit is further configured to execute the second task in response to receiving the second task descriptor.

10. The chip for inter-chip communication of claim 1, wherein the first computation circuit is further configured to:
- suspend the first task in response to a case where the sending of the processed data by the sending circuit is blocked; and/or
- suspend the first task in response to a case where the first task comprises a suspension instruction.

11. The chip for inter-chip communication of claim 9, wherein each of the first computation circuit and the first scheduling circuit comprise comprises a task execution list, and the task execution list at least comprises the position where the execution of the first task is suspended.

12. The chip for inter-chip communication of claim 11, wherein when a plurality of tasks are suspended, one of the plurality of tasks is resumed randomly, or a specific task with a highest priority is resumed according to priorities of the plurality of tasks, and the plurality of tasks includes the specific task.

13. A method for inter-chip communication, comprising:

receiving, by a first scheduling circuit of a chip, a task descriptor;

receiving, by a first computation circuit of the chip, the task descriptor from the first scheduling circuit of the chip, wherein the task descriptor includes a task identifier (ID), a task category, a data size, a data address, a parameter size, configuration information of the first computation circuit;

executing, by the first computation circuit of the chip, a first task according to the task descriptor, wherein the execution of the first task is for processing data, by the first computation circuit of the chip, according to the task descriptor to obtain processed data;

suspending, by the first computation circuit of the chip, the execution of first task based on a failure of caching of the processed data by a first storage circuit;

recording, by the first computation circuit of the chip, a position at which the execution of the first task is suspended;

executing, by the first computation circuit of the chip, a second task in response to suspending the execution of the first task, wherein the second task is scheduled by the first scheduling circuit based on the suspension of the execution of the first task;

resuming, by the first computation circuit of the chip, the first task according to the position where the execution of the first task is suspended and an end of the failure of caching;

sending, by the first computation circuit of the chip, the processed data to a sending circuit of the chip; and sending, under control of the first computation circuit of the chip, by the sending circuit of the chip, the processed data to another chip in response to reception of the processed data.

14. The method for inter-chip communication of claim 13, further comprising receiving, by the first computation circuit of the chip, the task descriptor from the first scheduling circuit of the chip;

at the first computation circuit of the chip, suspending the first task in response to a case where specific events happen; and at the first computation circuit of the chip, executing a second task in response to suspending the first task, wherein the specific events include:

the sending of the processed data by the sending circuit of the chip is blocked, and/or the first task comprises a suspension instruction.

15. The method for inter-chip communication of claim 13, further comprising:

sending, by the first computation circuit of the chip, the processed data to the sending circuit of the chip;

monitoring, by a monitor circuit of the chip, transmission of the processed data from the first computation circuit of the chip to the sending circuit of the chip, and sending a first instructing signal to the first scheduling circuit of the chip according to the transmission of the processed data from the first computation circuit of the chip to the sending circuit of the chip; and instructing, by the first scheduling circuit of the chip, the first computation circuit of the chip to release computation resources according to the first instructing signal.

16. The method for inter-chip communication of claim 15, comprising:

receiving, by the sending circuit of the chip, the processed data from the first computation circuit of the chip;

sending, by the sending circuit of the chip, a feedback signal in response to the reception of the processed data;

sending, by the monitor circuit of the chip, a second instructing signal to the first scheduling circuit according to the feedback signal; and instructing, by the first scheduling circuit of the chip, the first computation circuit of the chip to release task resources according to the second instructing signal.

17. The method for inter-chip communication of claim 15, comprising:

sending, by the first computation circuit of the chip, a first finish signal after transmission of the processed data is finished;

sending, by the monitor circuit of the chip, the first instructing signal to the first scheduling circuit of the chip in response to monitoring the first finish signal indicating that data transmission is finished; and instructing, by the first scheduling circuit of the chip, the first computation circuit to release the computation resources according to the first instructing signal.

18. A system for inter-chip communication, comprising:

a first chip; and a second chip, wherein the first chip comprises:

a first scheduling circuit;

a first computation circuit; and a sending circuit, wherein the first scheduling circuit is configured to receive a first task descriptor;

wherein the first computation circuit is configured to:

receive the first task descriptor from the first scheduling circuit wherein the first task descriptor includes a task identifier (ID), a task category, a data size, a data address, a parameter size, configuration information of the first computation circuit;

execute a first task to obtain first processed data based on the first task descriptor;

suspend the execution of the first task based on a failure of caching of the first processed data by a first storage circuit;

record a position at which the execution of the first task is suspended;

execute a second task in response to suspending the first task, wherein the second task is scheduled by the first scheduling circuit based on the suspension of the execution of the first task;

resume the first task according to the position where the execution of the first task is suspended and an end of the failure of caching; and send the first processed data to the sending circuit;

wherein the sending circuit, under control of the first computation circuit, is configured to send the first processed data to the second chip in response to reception of the first processed data; and the second chip comprises:

a second scheduling circuit;

a second computation circuit;

a receiving circuit; and a second storage circuit, wherein the receiving circuit is configured to:

receive the first processed data from the first chip;

send the first processed data to the second storage circuit;

notify the second scheduling circuit that the first processed data is received;

wherein the second scheduling circuit is configured to:

receive second task descriptor; and instruct the second computation circuit to process the first processed data;

wherein the second computation circuit is configured to:

acquire the first processed data from the second storage circuit;

receive the second task descriptor from the second scheduling circuit; and process the first processed data according to the second task descriptor to obtain second processed data.

* * * * *